(12) United States Patent
Noguchi et al.

(10) Patent No.: US 7,488,780 B2
(45) Date of Patent: Feb. 10, 2009

(54) PROCESS FOR PREPARING VINYL CHLORIDE COPOLYMER RESIN

(75) Inventors: Kisaburo Noguchi, Kobe (JP); Toshihito Kawauchi, Kobe (JP); Mitsuyoshi Kuwahata, Kobe (JP); Yukio Higashiyama, Otsu (JP)

(73) Assignee: Kaneka Corporation, Osaka (JP)

( * ) Notice: Subject to any disclaimer, the term of this patent is extended or adjusted under 35 U.S.C. 154(b) by 284 days.

(21) Appl. No.: 10/583,351

(22) PCT Filed: Dec. 14, 2004

(86) PCT No.: PCT/JP2004/018989

§ 371 (c)(1), (2), (4) Date: Jun. 19, 2006

(87) PCT Pub. No.: WO2005/061569

PCT Pub. Date: Jul. 7, 2005

(65) Prior Publication Data

US 2007/0167595 A1 Jul. 19, 2007

(30) Foreign Application Priority Data

Dec. 22, 2003 (JP) ............... 2003-425498
Dec. 26, 2003 (JP) ............... 2003-432877
Oct. 22, 2004 (JP) ............... 2004-308548

(51) Int. Cl.
*C08F 265/04* (2006.01)

(52) U.S. Cl. ............... 525/308; 525/309; 526/88; 526/329.4

(58) Field of Classification Search ............ 525/308, 525/309; 526/88, 329.4
See application file for complete search history.

(56) References Cited

U.S. PATENT DOCUMENTS 4,981,907 A * 1/1991 Klippert et al. ............ 525/82
5,142,004 A   8/1992 Amano et al.
5,248,733 A * 9/1993 Kitamura et al. ............ 525/317
5,292,836 A * 3/1994 Kitamura et al. ............ 526/88
5,314,966 A * 5/1994 Grauer et al. ............ 525/317

FOREIGN PATENT DOCUMENTS

| JP | 2-263810 A | 10/1990 |
| JP | 3-24105 A | 2/1991 |
| JP | 3-269005 A | 11/1991 |
| JP | 4-120109 A | 4/1992 |
| JP | 4-183704 A | 6/1992 |
| JP | 6-172406 A | 6/1994 |
| JP | 10-316705 A | 12/1998 |
| JP | 2004-83854 A | 3/2004 |

OTHER PUBLICATIONS

International Search Report mailed Mar. 29, 2005 of International Application PCT/JP2004/018989.
Translation of the International Preliminary Report on Patentability of International Application No. PCT/JP 2004/018989, with Form PCT/IB/373 and Form PCT/ISA/237.

* cited by examiner

*Primary Examiner*—Bernard Lipman
(74) *Attorney, Agent, or Firm*—Hamre, Schumann, Mueller & Larson, P.C.

(57) ABSTRACT

The present invention relates to a process for preparing a vinyl chloride copolymer resin by copolymerizing a vinyl chloride type monomer and a macromonomer having a polymer comprising an ethylenically unsaturated monomer containing a double bond in a main chain, which generates only a few scales and shows excellent polymerization stability. The present invention is achieved by the process for preparing a vinyl chloride copolymer resin by copolymerizing a vinyl chloride type monomer and a macromonomer having a polymer comprising an ethylenically unsaturated monomer containing a double bond in a main chain, wherein the vinyl chloride type monomer and the macromonomer having a polymer comprising an ethylenically unsaturated monomer containing a double bond in a main chain are dispersed and mixed at a temperature from 20° C. to 60° C. for at least 1 minute, and then copolymerization reaction thereof is initiated.

11 Claims, 1 Drawing Sheet

PROCESS FOR PREPARING VINYL CHLORIDE COPOLYMER RESIN

TECHNICAL FIELD

The present invention relates to a process for preparing a vinyl chloride copolymer resin. More precisely, the present invention relates to a process for preparing a vinyl chloride copolymer resin by copolymerizing a vinyl chloride type monomer and a macromonomer having a polymer comprising an ethylenically unsaturated monomer containing a double bond in a main chain, which generates only a few scales and shows excellent polymerization stability.

BACKGROUND ART

Vinyl chloride resin is excellent in its quality balance, as it is inexpensive and has good mechanical properties and chemical properties. In addition, vinyl chloride resin may form hard through soft molded articles when a plasticizer is added thereto. Therefore, vinyl chloride resin is a type of thermoplastic resin widely utilized in various fields. Its applications cover many fields, and vinyl chloride resin is therefore desired to have various properties necessary for such applications. For improving the necessary properties, not only vinyl chloride homopolymer resins but also vinyl chloride copolymer resins have been under investigation. For example, for improving the gelling property of plastisol prepared by dispersing a resin in a plasticizer so as to make it fluid, there is known a process of preparing a copolymer of a vinyl chloride type monomer and a vinyl monomer capable of forming a vinyl polymer having a low glass transition temperature (JP-A-63-23947). However, the process has some problems in that the both monomers may form homopolymers as polymerization reaction speed thereof often differs, and scales in the polymerization reactor increases.

DISCLOSURE OF INVENTION

An object of the present invention is to provide a process for preparing a vinyl chloride copolymer resin by copolymerizing a vinyl chloride type monomer and a macromonomer having a polymer comprising an ethylenically unsaturated monomer containing a double bond in a main chain, which generates only a few scales and shows excellent polymerization stability.

The present inventors have assiduously studied, and, as a result, have found that the above problem can be solved when a macromonomer having a polymer comprising an ethylenically unsaturated monomer containing a double bond in a main chain is previously dispersed and mixed in a vinyl chloride type monomer and thereafter copolymerization reaction thereof is initiated, and thus the present invention has been completed.

Specifically, the present invention relates to the following:

(1) A process for preparing a vinyl chloride copolymer resin by copolymerizing a vinyl chloride type monomer and a macromonomer having a polymer comprising an ethylenically unsaturated monomer containing a double bond in a main chain, wherein the vinyl chloride type monomer and the macromonomer having a polymer comprising an ethylenically unsaturated monomer containing a double bond in a main chain are dispersed and mixed at a temperature from 20° C. to 60° C. for at least 1 minute, and then copolymerization reaction thereof is initiated;

(2) The process for preparing a vinyl chloride copolymer resin, wherein the vinyl chloride type monomer and the macromonomer having a polymer comprising an ethylenically unsaturated monomer containing a double bond in a main chain are totally put into a dispersing-and-mixing tank, and then dispersed and mixed;

(3) The process for preparing a vinyl chloride copolymer resin, wherein the ratio of the vinyl chloride type monomer to the total amount of the monomer components constituting the vinyl chloride copolymer resin is at least 50% by weight up to less than 100% by weight;

(4) The process for preparing a vinyl chloride copolymer resin, wherein the ratio of (A) the vinyl chloride type monomer to (B) the macromonomer having a polymer comprising an ethylenically unsaturated monomer containing a double bond in a main chain (A/B) is 99.95% by weight/0.05% by weight to 60% by weight/40% by weight;

(5) The process for preparing a vinyl chloride copolymer resin, wherein the vinyl chloride type monomer and the macromonomer having a polymer comprising an ethylenically unsaturated monomer containing a double bond in a main chain are copolymerized in an aqueous medium;

(6) The process for preparing a vinyl chloride copolymer resin, wherein the vinyl chloride type monomer and the macromonomer having a polymer comprising an ethylenically unsaturated monomer containing a double bond in a main chain are prepared by at least one process selected from the group consisting of emulsion polymerization, suspension polymerization and micro suspension polymerization;

(7) The process for preparing a vinyl chloride copolymer resin, wherein the macromonomer having a polymer comprising an ethylenically unsaturated monomer containing a double bond in a main chain has a polymerizable reactive group, and said polymerizable reactive group has a structure containing at least one group represented by the following general formula per one molecule:

$$-OC(O)C(R)=CH_2 \qquad (1)$$

wherein R represents a hydrogen atom or an organic group having 1 to 20 carbon atoms;

(8) The process for preparing a vinyl chloride copolymer resin, wherein the macromonomer having a polymer comprising an ethylenically unsaturated monomer containing a double bond in a main chain is prepared by living radical polymerization;

(9) The process for preparing a vinyl chloride copolymer resin, wherein at least one of the macromonomers having a polymer comprising an ethylenically unsaturated monomer containing a double bond in a main chain has a glass transition temperature of at most 0° C.;

(10) A vinyl chloride copolymer resin composition which contains the vinyl chloride copolymer resin obtained by the above process.

According to the present invention, a vinyl chloride copolymer resin is obtained by copolymerizing a vinyl chloride type monomer and a macromonomer having a polymer comprising an ethylenically unsaturated monomer containing a double bond in a main chain, with inhibiting generation of scales.

BEST MODE FOR CARRYING OUT THE INVENTION

Figure 1:
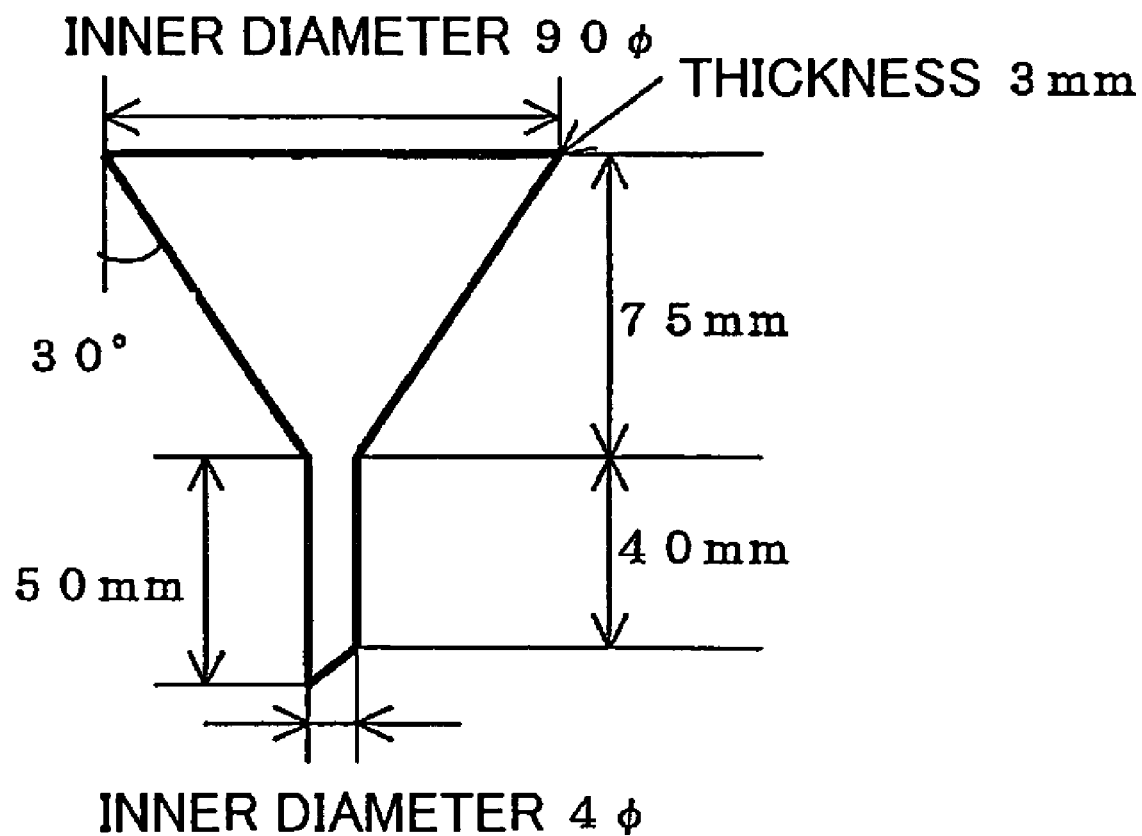
FIG. 1 is an outline view of a funnel used in powder flowability evaluation.

The vinyl chloride type monomer used in the present invention is not specifically limited. For example, herein usable are a vinyl chloride monomer, vinylidene chloride monomer, vinyl acetate monomer or a mixture thereof, or in addition, a monomer which is copolymerizable therewith and preferably gives no reactive functional group to the main chain of the polymer prepared by polymerization reaction, for example, one selected from α-olefins such as ethylene and propylene, or a mixture of at least two kinds of them. When a mixture of at least two kinds is used, it is preferable that the vinyl chloride monomer content based on the entire vinyl chloride type monomer is at least 50% by weight and more preferably at least 70% by weight. In view of the physical properties of the copolymer resin to be obtained, it is more preferable that only one of vinyl chloride monomer or vinylidene chloride monomer is used, and even more preferably, vinyl chloride monomer is used.

A macromonomer is generally an oligomer having a reactive functional group at the terminal thereof. The macromonomer having a polymer comprising an ethylenically unsaturated monomer containing a double bond in a main chain is prepared by radical polymerization, and has at least one group having a polymerizable carbon-carbon double bond selected from an allyl group, vinylsilyl group, vinyl ether group, dicyclopentadienyl group and the following general formula (1) per one molecule at the terminal of the molecule, as a reactive functional group.

In particular, the group having a polymerizable carbon-carbon double bond is preferably represented by the following general formula:

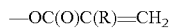

—OC(O)C(R)=CH$_2$ as its reactivity with a vinyl chloride type monomer is good.

In the formula, concrete examples of R are not specifically limited. For example, R is preferably selected from —H, —CH$_3$, —CH$_2$CH$_3$, —(CH$_2$)$_n$CH$_3$ (where n indicates an integer of 2 to 19), —C$_6$H$_5$, —CH$_2$OH and —CN; and more preferably, —H or —CH$_3$.

The polymer comprising an ethylenically unsaturated monomer containing a double bond, which is the main chain of the macromonomer used in the present invention, is prepared by radical polymerization. Radical polymerization is classified into "general radical polymerization" in which a monomer having a specific functional group and a vinyl monomer are simply copolymerized using an azo compound or a peroxide as a polymerization initiator; and "controlled radical polymerization" in which a specific functional group can be introduced into a controlled position such as a terminal of a polymer.

In "general radical polymerization", a monomer having a specific functional group cannot be introduced into a polymer only at random, and therefore, when a polymer having a high functionalization is desired to be obtained, a relatively large quantity of the monomer need to be used. In addition, since "general radical polymerization" is free radical polymerization, molecular weight distribution of the polymer obtained is so broad that it is difficult to obtain a polymer having low viscosity.

"Controlled radical polymerization" can be further classified into "chain transfer polymerization" in which a chain transfer agent having a specific functional group is used for polymerization to give a vinyl polymer having a functional group at the terminal thereof, and "living radical polymerization" in which a polymer having a molecular weight approximately designed is obtained by growing a polymerization growth end without causing a termination reaction etc.

"Chain transfer polymerization" makes it possible to obtain a polymer having a high functionalization degree, but requires a chain transfer agent having a specific functional group for an initiator. In addition, "chain transfer polymerization" is also free radical polymerization like the above-mentioned "general radical polymerization", and therefore molecular weight distribution of the polymer obtained is so broad that it is difficult to obtain a polymer having low viscosity.

Differring from these polymerization processes, "living radical polymerization" is radical polymerization which is said to be difficult to control as polymerization speed is so high that termination reaction readily occurs due to coupling of radicals etc., as described in the international publication WO99/65963 relating to the invention by the present applicant. However, "living radical polymerization" hardly undergoes termination reaction, and it readily gives a polymer having a narrow molecular weight distribution, for example, having a ratio of weight average molecular weight Mw to number average molecular weight. Mn (Mw/Mn) of 1.1 to 1.5 or so, and, in addition, the molecular weight of a polymer can be freely controlled depending on the ratio of the monomer and the initiator charged.

Accordingly, in such "living radical polymerization", since a polymer having a narrow molecular weight distribution and a low viscosity can be obtained and additionally since a monomer having a specific functional group can be introduced into almost any position of the polymer obtained, "living radical polymerization" is a more preferable polymerization process for preparing the above-mentioned vinyl polymer having a specific functional group in the present invention.

Among "living radical polymerization", "Atom Transfer Radical Polymerization: ATRP" in which a vinyl monomer is polymerized in the presence of an organic halide or a sulfonyl halide compound as an initiator and a transition metal complex as a catalyst, is further preferable for preparing a vinyl polymer having a specific functional group since "atom transfer radical polymerization" has characteristics in that a polymer used has a halogen etc., which is relatively advantageous for functional group conversion reaction, at its terminal and latitude in designing an initiator and a catalyst is large, in addition to the characteristics of "living radical polymerization" mentioned above. For atom transfer radical polymerization, for example, referred to is Matyjaszewski et al., Journal of American Chemical Society, 1995, Vol. 117, p. 5614.

The macromonomer, which is used in the present invention, having a polymer comprising an ethylenically unsaturated monomer containing a double bond in a main chain has a molecular weight distribution, that is, the ratio of a weight average molecular weight (Mw) to a number average molecular weight (Mn) thereof measured by gel permeation chromatography (hereinunder abbreviated to GPC) (Mw/Mn) of preferably less than 1.8, more preferably at most 1.6, even more preferably at most 1.4. Measurement by GPC in the present invention was conducted at room temperature using a Waters' GPC system (Model No. 510), wherein chloroform is used as the mobile phase and also Shodex K-802.5 and K-804 (polystyrene gel columns) available from Showa Denko K.K. are used. The macromonomer having a molecular weight distribution of less than 1.8 is preferable since polymerization may go on stably to give polymer particles having a reduced surface roughness; and the macromonomer having a molecular weight distribution of at most 1.4 is more preferable since fluctuation of surface tension of vinyl chloride type monomer droplets is so small that stable and uniform polymer particles having a surface of good condition can be prepared.

The number average molecular weight of the macromonomer having a polymer comprising an ethylenically unsaturated monomer containing a double bond in a main chain measured by GPC is not specifically limited, however, is preferably 500 to 100,000, more preferably 3,000 to 40,000, and most preferably 5,000 to 20,000. The macromonomer falling within the range is preferable since the vinyl chloride polymer resin prepared using thereof may have good plasticizer absorbability.

The process for preparing the macromonomer in the present invention is not specifically limited, however, generally employed is controlled radical polymerization. Living radical polymerization is preferable in view of easiness of controlling the reaction, and most preferable is atom transfer radical polymerization. The macromonomer having a polymer comprising an ethylenically unsaturated monomer containing a double bond in a main chain, which is prepared by controlled radical polymerization, precisely by living radical polymerization, can be completely copolymerized with a vinyl chloride resin at its terminal, and is therefore preferable since the surface roughness of the polymer particles to be prepared can be reduced by modifying the monomer composition in the vinyl chloride type monomer droplets or around the interface thereof.

The polymer comprising ethylenically unsaturated monomer containing a double bond, which the main chain of the macromonomer used in the present invention has, is not specifically limited, and various types of polymers may be employed for an ethylenically unsaturated monomer containing a double bond which constitutes the polymer. For example, the monomer includes (meth)acrylic acid monomers such as (meth)acrylic acid, methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, n-pentyl (meth)acrylate, n-hexyl (meth)acrylate, cyclohexyl (meth)acrylate, n-heptyl (meth)acrylate, n-octyl (meth)acrylate, 2-ethylhexyl (meth)acrylate, nonyl (meth)acrylate, decyl (meth)acrylate, dodecyl (meth)acrylate, phenyl (meth)acrylate, tolyl (meth)acrylate, benzyl (meth)acrylate, 2-methoxyethyl (meth)acrylate, 3-methoxybutyl (meth)acrylate, 2-hydroxyethyl (meth)acrylate, 2-hydroxypropyl (meth)acrylate, stearyl (meth)acrylate, glycidyl (meth)acrylate, 2-aminoethyl (meth)acrylate, γ-(methacryloyloxypropyl)trimethoxysilane, ethylene oxide adducts of (meth)acrylic acid, trifluoromethylmethyl (meth)acrylate, 2-trifluoromethylethyl (meth)acrylate, 2-perfluoroethylethyl (meth)acrylate, 2-perfluoroethyl-2-perfluorobutylethyl (meth)acrylate, 2-perfluoroethyl (meth)acrylate, perfluoromethyl (meth)acrylate, diperfluoromethylmethyl (meth)acrylate, 2-perfluoromethyl-2-perfluoroethylmethyl (meth)acrylate, 2-perfluorohexylethyl (meth)acrylate, 2-perfluorodecylethyl (meth)acrylate, 2-perfluorohexadecylethyl (meth)acrylate; styrene monomers such as styrene, vinyltoluene, α-methylstyrene, chlorostyrene, styrenesulfonic acid and salts thereof; fluorine-containing vinyl monomers such as perfluoroethylene, perfluoropropylene, vinylidene fluoride; silicon-containing vinyl monomers such as vinyltrimethoxysilane, vinyltriethoxysilane; maleic anhydride, maleic acid, monoalkyl ester and dialkyl ester of maleic acid; fumaric acid, monoalkyl ester and dialkyl ester of fumaric acid; maleimide monomers such as maleimide, methylmaleimide, ethylmaleimide, propylmaleimide, butylmaleimide, hexylmaleimide, octylmaleimide, dodecylmaleimide, stearylmaleimide, phenylmaleimide, cyclohexylmaleimide; nitrile group-containing vinyl monomers such as acrylonitrile, methacrylonitrile; amide group-containing vinyl monomers such as acrylamide, methacrylamide; vinyl esters such as vinyl acetate, vinyl propionate, vinyl pivalate, vinyl benzoate, vinyl cinnamate; alkenes such as ethylene, propylene; conjugated dienes such as butadiene, isoprene; allyl chloride, allyl alcohol. These may be used alone, or two or more of these may be copolymerized. Among them, preferred are styrene monomers and (meth)acrylic acid monomers in view of the physical properties of the products. More preferred are acrylate monomers and methacrylate monomers; even more preferred are acrylate monomers; and most preferred is butyl acrylate. In the present invention, the preferred monomer may be copolymerized with any other monomer, and it is desirable that the ratio the preferred monomer is at least 40% by weight. The wording "(meth)acrylic acid" is meant to indicate methacrylic acid or acrylic acid.

The macromonomer used in the present invention is characterized in that it has such a polymer comprising an ethylenically unsaturated monomer containing a double bond in a main chain, and additionally has at least one reactive functional group per one molecule at the terminal of the molecule.

One macromonomer alone may be copolymerized with the vinyl chloride type monomer in the present invention, or two or more of macromonomers in which ethylenically unsaturated monomers constituting the macromonomers are different may be used in a combination.

Regarding the glass transition temperature of the macromonomer having a polymer comprising an ethylenically unsaturated monomer containing a double bond in a main chain, in the case where one macromonomer is used alone or at least two kinds thereof are used in a combination, it is desirable that at least one macromonomer used herein has a glass transition temperature of at most 0° C., more preferably at most −20° C., most preferably at most −50° C. When two or more macromonomers are used in a combination, it is desirable that the macromonomer having a grass transition temperature of at most −50° C. is used at an amount of at least 50% by weight among all the macromonomers.

The ratio of the vinyl chloride type monomer to the total of all monomer components that constitute the vinyl chloride copolymer resin of the present invention is not specifically limited so far as it falls within a range capable of exhibiting the effect of the present invention. Preferably, it is at least 50% by weight up to less than 100% by weight, more preferably 50% by weight to 99.95% by weight. The copolymer resin in which the vinyl chloride type monomer ratio is at least 50% by weight up to less than 100% by weight is expected to have some advantages in that the copolymerization reaction is stable, and in addition the vinyl chloride copolymer resin obtained is powdery and therefore the latitude in processing thereof increases.

Additionally, in the case where the macromonomer composition ratio (% by weight) to the total of the vinyl chloride type monomer and the macromonomer (100% by weight) is in the range of 0.05 to 40% by weight, preferably 0.05 to 20% by weight, it is preferable since surface roughness of particles (Ra) may be reduced, and also bulk specific gravity may be high and powdery flowability may be good.

When the vinyl chloride copolymer resin is prepared by suspension polymerization, the macromonomer composition ratio (% by weight) is preferably 0.05 to 5% by weight, more preferably 0.05 to 3% by weight, even more preferably at least 0.05% by weight up to less than 1% by weight in the view point that the resin particles undergo little blocking even in high-temperature and high-humidity environments in summer or the like and the macromonomer has little influences on the physical properties of the vinyl chloride resin.

The average polymerization degree and the average molecular weight of the vinyl chloride copolymer resin of the present invention are not specifically limited. Like that of vinyl chloride resins prepared and used in an ordinary manner, the K value of the resin of the present invention, as measured according to JIS K 7367-2 (ISO 1628-2), is 50 to 95.

The weight average particle size of the aqueous dispersion of the vinyl chloride polymer resin of the present invention is not specifically limited, but preferably is 0.01 to 500 μm, more preferably 0.1 to 250 μm, even more preferably 1 to 200 μm. The vinyl chloride polymer resin falling within the range is preferable since its aqueous dispersion exhibits good polymerization stability.

There is no specific limitation regarding the process for preparing the vinyl chloride copolymer resin of the present invention, however, preferred is copolymerization in an aqueous medium in the viewpoint of easiness of polymerization control such that the polymerization reaction heat can be removed and over-reaction can be inhibited. For example, preparation process of suspension polymerization, microsuspension polymerization and emulsion polymerization are exemplified and any of these may be employed herein. In the preparation process, a macromonomer having a polymer comprising an ethylenically unsaturated monomer containing a double bond in a main chain is previously dispersed and mixed in a vinyl chloride type monomer in a dispersing-and-mixing tank. Not specifically limited, the dispersing-and-mixing tank may be any one in which monomers can be dispersed and mixed. For example, a polymerization reactor may be used, or any chambers other than a polymerization reactor that are equipped with a jacket and a stirrer may also be used.

The temperature at which a macromonomer having a polymer comprising an ethylenically unsaturated monomer containing a double bond in a main chain is dispersed and mixed in a vinyl chloride type monomer is preferably 20° C. to 60° C., more preferably 30° C. to 50° C. The temperature being 20° C. to 60° C. is desirable in the viewpoint that a macromonomer having a polymer comprising an ethylenically unsaturated monomer containing a double bond in a main chain can be uniformly dispersed and mixed in a vinyl chloride type monomer while the pressure in the dispersing-and-mixing tank can kept suitable for dispersion and mixing therein.

The time which is required for dispersing and mixing a macromonomer having a polymer comprising an ethylenically unsaturated monomer containing a double bond in a main chain in a vinyl chloride type monomer is not also specifically limited so far as it is enough for dispersing and mixing. Preferably, however, the time is at least 1 minute. The time of at least 1 minute may be enough for the uniform dispersion and mixing of a macromonomer having a polymer comprising an ethylenically unsaturated monomer containing a double bond in a main chain in a vinyl chloride type monomer.

The wording of "dispersing and mixing" as referred to herein is meant to indicate that both the vinyl chloride type monomer and the macromonomer having a polymer comprising an ethylenically unsaturated monomer containing a double bond in a main chain can be uniformly mixed together with no interface therebetween and, as a result, the two cannot be apparently differentiated from each other.

The wording of "previously dispersing and mixing" is meant to indicate that a vinyl chloride type monomer and a macromonomer having a polymer comprising an ethylenically unsaturated monomer containing a double bond in a main chain are dispersed and mixed before any of suspension dispersant, polymerization initiator, surfactant, dispersion aid, antioxidant, polymerization degree-controlling agent, chain transfer agent, particle size-controlling agent, pH-controlling agent, gellation improver, antistatic agent, stabilizer and scale inhibitor that are optionally used in suspension polymerization, microsuspension polymerization or emulsion polymerization is fed.

Not specifically limited, the process of dispersing and mixing a vinyl chloride type monomer and a macromonomer having a polymer comprising an ethylenically unsaturated monomer containing a double bond in a main chain may be any one capable of attaining uniform dispersion and mixing of the two. One preferred embodiment of the process comprises feeding a predetermined amount of a vinyl chloride type monomer and a predetermined amount of a macromonomer having a polymer comprising an ethylenically unsaturated monomer containing a double bond in a main chain totally into a dispersing-and-mixing tank, and then dispersing and mixing are conducted. The process includes, for example, a process comprising feeding a vinyl chloride type monomer in a previously-degassed polymerization reactor, then feeding a macromonomer having a polymer comprising an ethylenically unsaturated monomer containing a double bond in a main chain thereinto, and dispersing and mixing them at a predetermined temperature for a predetermined period of time; a process comprising feeding a part of a vinyl chloride type monomer in a previously-degassed polymerization reactor, then feeding a macromonomer having a polymer comprising an ethylenically unsaturated monomer containing a double bond in a main chain thereinto, then further feeding the remaining part of the vinyl chloride type monomer thereinto, and dispersing and mixing them at a predetermined temperature for a predetermined period of time; a process comprising previously feeding a macromonomer having a polymer comprising an ethylenically unsaturated monomer containing a double bond in a main chain into a polymerization reactor, degassing the reactor, then feeding a vinyl chloride type monomer thereinto, and dispersing and mixing them at a predetermined temperature for a predetermined period of time; a process comprising feeding both a vinyl chloride type monomer and a macromonomer having a polymer comprising an ethylenically unsaturated monomer containing a double bond in a main chain into a previously-degassed polymerization reactor at one time, and then dispersing and mixing them at a predetermined temperature for a predetermined period of time; a process comprising previously dispersing and mixing a macromonomer having a polymer comprising an ethylenically unsaturated monomer containing a double bond in a main chain in a vinyl chloride type monomer, in a chamber except polymerization reactor at a predetermined temperature for a predetermined period of time to prepare a mixture, and then feeding the resulting mixture into a previously-degassed polymerization reactor. Any of these processes may be employed.

These processes of uniformly dispersing and mixing a macromonomer having a polymer comprising an ethylenically unsaturated monomer containing a double bond in a main chain in a vinyl chloride type monomer are expected to have the advantage of improved polymerization stability in that the processes may inhibit the occurrence of problems such as "Normal particles cannot be obtained because the copolymerization is abnormal." "Though the copolymerization is not abnormal, the removal of the polymerization heat is unsatisfactory.", or "Even when normal particles are obtained, a lot of scales are formed."

In the present invention, after a macromonomer having a polymer comprising an ethylenically unsaturated monomer containing a double bond in a main chain is dispersed and mixed in a vinyl chloride type monomer, any of suspension dispersant, polymerization initiator, surfactant, dispersion aid, antioxidant, polymerization degree-controlling agent, chain transfer agent, particle size-controlling agent, pH-controlling agent, gellation improver, antistatic agent, stabilizer and scale inhibitor that are optionally used in suspension polymerization, microsuspension polymerization or emulsion polymerization is optionally added thereto, all at one time or dividedly or continuously thereinto, and the monomers are copolymerized at a predetermined polymerization temperature.

Not specifically limited, any suspension dispersant may be used herein not interfering with the object of the present invention. Such suspension dispersants may be an organic polymer dispersant, for example, partially-saponified polyvinyl acetate; water-soluble cellulose ethers such as methyl cellulose, hydroxyethyl cellulose, hydroxypropyl cellulose, hydroxypropylmethyl cellulose, carboxymethyl cellulose; polyethylene oxide; polyvinylpyrrolidone; polyacrylic acid; vinyl acetate/maleic acid copolymer; styrene/maleic acid copolymer; gelatin; starch. These may be used alone or two kinds or more may be used in a combination.

The polymerization initiator in suspension polymerization or microsuspension polymerization is not specifically limited, and oil-soluble polymerization initiators may be added not interfering with the object of the present invention. Among these, one kind or two kinds or more of initiators having a 10-hour-halflife temperature of 30 to 65° C. are preferably used. Such polymerization initiators include, for example, organic peroxide polymerization initiators such as acetylcyclohexylsulfonyl peroxide, 2,4,4-trimethylpentyl-2-peroxyneodecanoate, diisopropylperoxydicarbonate, di(2-ethylhexyl)peroxydicarbonate, t-butylperoxypivalate, t-butyl peroxyneodecanoate, 1,1,3,3-tetramethylbutyl peroxyneodecanoate, dilauroyl peroxide, 3,5,5-trimethylhexanoyl peroxide; and azo polymerization initiators such as 2,2'-azobisisobutyronitrile, 2,2'-azobis-(4-methoxy-2,4-dimethylvaleronitrile), 2,2'-azobis-(2,4-dimethylvaleronitrile). These can be used alone or two kinds or more can be used in a combination. The oil-soluble polymerization initiator may be added to the reaction system with no specific limitation on its condition, however, for example when it is used to be dissolved in an organic solvent, examples of the organic solvent are aromatic hydrocarbons such as toluene, xylene, benzene; aliphatic hydrocarbons such as hexane, isoparaffin; ketones such as acetone, methyl ethyl ketone; and esters such as ethyl acetate, butyl acetate, dioctyl phthalate. These can be used alone or two kinds or more can be used in a combination.

In emulsion polymerization, any water-soluble polymerization initiator may be used with no specific limitation thereon, not interfering with the object of the present invention. Such water-soluble polymerization initiator includes, for example, ammonium persulfate, potassium persulfate, sodium persulfate, aqueous hydrogen peroxide. If desired, a reducing agent such as sodium sulfite, sodium thiosulfate, formaldehyde sodium sulfoxylate dihydrate, ascorbic acid, sodium ascorbate may be used along with the initiator. These can be used alone or two kinds or more can be used in a combination.

Also not specifically limited, any surfactant may be used not interfering with the object of the present invention. Such surfactants are anionic surfactants such as alkylsulfate ester salts, alkylarylsulfonate salts, alkylsulfosuccinate salts, fatty acid salts, α-olefinsulfonate salts, alkyl ether phosphate ester salts, polyoxyethylene alkylarylsulfate ester salts, polyoxyethylene alkylsulfate ester salts (herein, "salts" refer to potassium salts, sodium salts, ammonium salts, etc.); and hydrophilic nonionic surfactants such as sorbitan esters, polyoxyethylene alkyl ethers, polyoxyethylene alkylphenyl ethers, polyoxyethylene alkyl esters. These can be used alone or two kinds or more can be used in a combination.

The dispersion aid is not also specifically limited, and may be any one not interfering with the object of the present invention. Preferred examples of the dispersion aid are higher alcohols such as lauryl alcohol, myristyl alcohol, cetyl alcohol, stearyl alcohol; higher fatty acids such as lauric acid, myristic acid, palmitic acid, stearic acid; esters of higher fatty acids; higher aliphatic hydrocarbons; halogenated hydrocarbons; and water-soluble polymers. These can be used alone or two kinds or more can be used in a combination.

The vinyl chloride polymer resin of the present invention may be used either in a form of an aqueous dispersion or a dried resin powder. Preferably, it is used in a form of a dried resin powder as its handlability is good.

The method of drying the aqueous dispersion of the vinyl chloride polymer resin is not specifically limited, and vinyl chloride polymer resin powder is obtained, for example, by a method that an aqueous dispersion after polymerization is subjected to centrifugal dewatering and then dried in a fluidized bed, a method that dewatered resin is jet into steam and collected using a dust collector such as cyclone, or a method that resin dispersion is dried into powder using a double-flow nozzle or an atomizer.

The vinyl chloride resin powder is an aggregated dried article of single or multiple particles that are prepared by heating an aqueous dispersion of a vinyl chloride polymer to thereby remove as much water content as possible therefrom. The particle size of the vinyl chloride polymer resin powder is not specifically limited, and is 10 μm to 1000 μm, preferably 20 μm to 500 μm, more preferably 30 μm to 200 μm. The vinyl chloride polymer resin powder falling within the range is desirable since its powdery flowability is good.

Suspension polymerization to be employed for preparing the vinyl chloride polymer resin of the present invention is not specifically limited, however, any ordinary technique may be employed for feeding starting materials into a reactor. For example, most popular processes are a process of firstly feeding water into a reactor and then feeding a vinyl chloride type monomer and a macromonomer thereinto; a process of firstly feeding a vinyl chloride type monomer and a macromonomer into a reactor and then feeding hot water thereinto for the purpose of shortening the time to be taken for heating the system up to the polymerization temperature; and a process of feeding a vinyl chloride type monomer and a macromonomer into a reactor along with hot water thereinto for the purpose of further shortening the time to be taken for feeding monomers and heating the system.

In addition, antioxidant, polymerization degree-controlling agent, chain transfer agent, particle size-controlling agent, pH-controlling agent, gellation improver, antistatic agent, stabilizer and scale inhibitor that are generally used in preparation of ordinary vinyl chloride resin may also be used optionally, if desired, and the amount thereof is not specifically limited.

Also not specifically limited, any vinyl chloride homopolymer resin may be combined, if desired, with the vinyl chloride polymer resin composition of the present invention. Further if desired, plasticizer, filler, heat stabilizer, flame retardant, lubricant, antistatic agent, reinforcing agent, modifier and pigment may be added.

The vinyl chloride polymer resin of the present invention may be used alone, or may be used as combined with at least one vinyl chloride homopolymer resin. When such vinyl chloride polymer resins are combined, there is not specific limitation thereon. For example, aqueous dispersions may be combined; or resin powder separately dried may be combined with an aqueous dispersion; or resin powders may be combined. When a vinyl chloride homopolymer resin is used as combined, it is desirable that the proportion of the vinyl chloride polymer resin of the present invention is 3 to 90% by weight, more preferably 5 to 80% by weight, most preferably 10 to 50% by weight of all the vinyl chloride resins. The combined resin mixture in which the content of the resin of the present invention is 3 to 90% by weight may have improved bulk specific gravity, and the combined resin mixture in which the content of the resin of the present invention is 10 to 50% by weight has good powdery flowability, thus being preferable.

For controlling the flexibility of the vinyl chloride polymer resin composition, a plasticizer may be optionally added to the composition. For example, usable are one or at least two kinds of plasticizers selected from phthalic acid ester plasticizers such as di-2-ethylhexyl phthalate (DOP), di-n-octyl phthalate, diisononyl phthalate (DINP), dibutyl phthalate (DBP); phosphoric acid ester plasticizers such as tricresyl phosphate (TCP), trixylyl phosphate (TXP), triphenyl phosphate (TPP); fatty acid ester plasticizers such as di-2-ethylhexyl adipate (EDHA), di-2-ethylhexyl sebacate; and polyacrylic plasticizers such as poly(butyl acrylate), n-butyl acrylate/methyl methacrylate copolymer, 2-ethylhexyl acrylate/methyl methacrylate copolymer, 2-ethylhexyl acrylate/methyl methacrylate/n-butyl methacrylate copolymer. When the vinyl chloride polymer resin of the present invention is used alone, the amount of the plasticizer used is preferably 10 to 100 parts by weight, more preferably 20 to 70 parts by weight, most preferably 20 to 50 parts by weight based on 100 parts by weight of the vinyl chloride resin comprising the vinyl chloride polymer resin of the present invention and an additional vinyl chloride resin in order to control the desired flexibility of the vinyl chloride polymer resin composition.

A heat stabilizer may be optionally added for controlling the thermal stability of the vinyl chloride polymer resin composition. Such heat stabilizer includes, for example, organic tin stabilizers such as dimethyltin mercaptide, dibutyltin mercaptide, dioctyltin mercaptide, dibutyltin maleate, dibutyltin maleate polymer, dioctyltin maleate, dioctyltin maleate polymer, dibutyltin laurate, dibutyltin laurate polymer; lead stabilizers such as lead stearate, dibasic lead phosphite, tribasic lead sulfate; calcium-zinc stabilizers; barium-zinc stabilizers; cadmium-barium stabilizers. These can be used alone or two kinds or more can be used in a combination. The amount thereof to be used is not specifically limited, but is preferably 0 to 5 parts by weight based on 100 parts by weight of the vinyl chloride resin comprising the vinyl chloride polymer resin of the present invention and an additional vinyl chloride resin.

The stabilization aid is not specifically limited, and any one not interfering with the object of the present invention can be used. For example, such stabilization aid includes epoxidized soybean oil, epoxidized linseed oil, epoxidized tetrahydrophthalate, epoxidized polybutadiene and phosphoric esters. These can be used alone or two kinds or more can be used in a combination, and the amount thereof to be used is not specifically limited.

The filler is not also specifically limited, and includes, for example, calcium carbonate, magnesium carbonate, lithium carbonate, kaolin clay, gypsum, mica, talc, magnesium hydroxide, calcium silicate and borax. The filler may be used at an amount within a range for transparent applications or for a reinforcing agent, and in general, it is desirable that the amount of the filler to be used is 0 to 500 parts by weight, more preferably 0 to 200 parts by weight, most preferably 0 to 100 parts by weight based on 100 parts by weight of the vinyl chloride resin comprising the vinyl chloride polymer resin of the present invention and an additional vinyl chloride resin.

The process for preparing the vinyl chloride polymer resin composition of the present invention is not specifically limited, and the vinyl chloride polymer resin composition of the present invention is prepared, for example, by the process, wherein the vinyl chloride copolymer resin of the present invention and any other optional vinyl chloride resin are compounded at a predetermined amount, and further optionally other additives (e.g., heat stabilizer, lubricant, stabilization aid, processing aid, filler, antioxidant, light stabilizer, pigment and plasticizer) are added thereto; thereby these are uniformly mixed in an ordinary manner such as hot blending or cold blending using a mixing machine such as a Henschel mixer. Herein, the order of mixing the components is not specifically limited. For example, the vinyl chloride polymer resin of the present invention and the optional additives are mixed all at one time, or the vinyl chloride polymer resin of the present invention and various powdery additives are previously mixed, and then liquid additives are added thereto for the purpose of compounding liquid additives uniformly mixed.

EXAMPLES

The present invention is explained in detail with reference to the following Examples, to which, however, the present invention should not be limited. Unless otherwise specifically indicated, "part" and "%" in the Examples mean "part by weight" and "% by weight", respectively.

<Evaluation of Polymerization Stability>

Polymerization stability was evaluated by visual inspection of the state of scales in the polymerization reactor after taking out the contents according to the criteria mentioned below.

o: Few scales were deposited on the inner wall of the reactor and/or on the stirrer.

Δ: A few scales were deposited on the inner wall of the reactor and/or on the stirrer.

x: A significant amount of scales were deposited on the inner wall of the reactor and/or on the stirrer.

<Preparation of Macromonomer Having a Polymer Comprising an Ethylenically Unsaturated Monomer Containing a Double Bond in a Main Chain>

The macromonomer having a polymer comprising an ethylenically unsaturated monomer containing a double bond in a main chain was prepared according to the process of Preparation Examples mentioned below.

<Determination of Mean Particle Size, Bulk Specific Gravity, Surface Roughness and Powdery Flowability>

Mean particle size, bulk specific gravity, surface roughness and powdery flowability of resin samples were determined according to the following methods.

(A) Mean Particle Size

The resins obtained in Examples 11 to 15 and Comparative Examples 17 to 19 were analyzed as follows. The resin was left under a condition of 23° C./50% RH for 24 hours. According to JIS K 6720-2 (ISO 1060-2), the resin was screened through sieves having an opening size of 355 μm, 250 μm, 180 μm, 150 μm, 125 μm, 106 μm and 75 μm under the condition of 23° C./50% RH, using a full-automatic acoustic screen classifier (Model: Robot Shifter RPS-85; available from Seishin Enterprise Co., Ltd.), and the 50%-passed sieve size was assumed to be a weight average particle size (μm) of the sample.

The resins obtained in Examples 16 to 22 and Comparative Examples 20 to 23 were analyzed as follows: After the polymerization, the resultant slurry or latex was left under a condition of 23° C./50% RH for 24 hours, and this is then measured under the condition of 23° C./50% RH, using MULTISIZER II available from Coulter Electronics Ltd. The 50% cumulative weight distribution of the sample was assumed to be a weight average particle size.

(B) Bulk Specific Gravity

Bulk specific gravity of the sample was determined according to JIS K 6720-2 (ISO 1060-2).

(C) Surface Roughness of Particles (Ra)

The resins obtained in Examples 11 to 22 and Comparative Examples 17 to 23 were analyzed as follows: The resin was left under a condition of 23° C./50% RH for 24 hours. According to the surface roughness definition described in JIS B 0601 (ISO 4287), the resin was evaluated by means of measuring an arithmetic mean surface roughness Ra (μm) of the surface of several tens of resin particles, then calculating the average thereof, under the condition of 23° C./50% RH, using an ultra-deep color three-dimensional profile analyzing microscope (Model: VK-9501, available from Keyence Co., Ltd.).

(D) Powdery Flowability

The resins obtained in Examples 11 to 15 and Comparative Examples 17 to 19 were analyzed as follows: The resin was left under a condition of 23° C./50% RH for 24 hours. Under the condition of 23° C./50% RH, the mouth of a funnel shown in FIG. 1 was sealed up with a stopper, and 100 ml of the resin analyzed according to the bulk specific gravity measuring method described in JIS K6720-2 (ISO 1060-2) was put into the funnel. After the resin was completely put into the funnel, the stopper was removed from the mouth of the funnel, and the time t (sec) required for the resin totally to drop off was measured. From the time, t and the weight, W (g) of 100 ml of the resin, the weight of the resin that dropped per a unit of time, W/t (g/sec) was calculated, and the value obtained was used for the index of the powdery flowability of the sample.

The resins obtained in Examples 16 to 22 and Comparative Examples 20 to 23 were analyzed as follows: The resin was left under the condition of 23° C./50% RH for 24 hours. 100 g of the resin was put on a JIS standard sieve having an opening size of 250 μm fixed on a KM-shaker (Model: V-SX available from Iwaki Sangyo. Co., Ltd.). A 50 g weight was fixed to one end of a 30 cm string in such a manner that the weight can hit the side of the sieve. The weight was made to freely drop from the position of an angle of 60° against the vertical face, and this was repeated 30 times. The weight (g) of the resin having passed through the sieve was measured.

(E) Blocking Resistance

The resins obtained in Examples 11 to 22 and Comparative Examples 17 to 23 were analyzed as follows. About 50 g of the resin was sandwiched between ferroplates, a weight was put thereon so that the amount of the resin may be 1 g/cm². Under the condition of 50° C./80% RH, the resin was left for 24 hours, and then the condition of the resin was visually observed.

o: Not changed at all from the original condition of the resin and aggregation of the resin particles was not observed.

Δ: A part of the particles aggregated, or aggregated particles immediately disintegrated when they were rubbed with fingers.

x: The particles aggregated as a whole, or the aggregated resin particles could not disintegrate if not strongly rubbed with fingers.

Preparation Example 1

CuBr (5.54 g) was put into a 2-liter separable flask equipped with a reflux tube and a stirrer, and the reactor was purged with nitrogen. Acetonitrile (73.8 ml) was added thereto, and stirred in an oil bath at 70° C. for 30 minutes. N-butyl acrylate (132 g), methyl 2-bromopropionate (7.2 ml) and pentamethyldiethylenetriamine (4.69 ml) were added thereto, and the reaction was initiated. While stirring with heat at 70° C., n-butyl acrylate (528 g) was continuously and dropwisely added over 90 minutes, and further stirred with heat for 80 minutes.

The reaction mixture was diluted with toluene, and passed through an active alumina column, and then the volatiles were evaporated away under reduced pressure to obtain poly(n-butyl acrylate) having a Br group at one end.

Methanol (800 ml) was fed into a flask and cooled to 0° C. Potassium t-butoxide (130 g) was divided into a few portions and added intermittently. The reaction solution was kept at 0° C., and a methanol solution of acrylic acid (100 g) was dropwisely added thereto. After the addition, the reaction solution was restored from 0° C. to room temperature, and the volatiles were evaporated away therefrom under reduced pressure to obtain potassium acylate ($CH_2$=$CHCO_2K$).

The obtained poly(n-butyl acrylate) having a Br group at one end (150 g) and potassium acrylate (7.45 g), and dimethylacetamide (150 ml) were put into a 500-ml flask equipped with a reflux tube, and stirred with heat at 70° C. for 3 hours. Dimethylacetamide was evaporated away from the reaction mixture, and the residue was dissolved in toluene, and passed through an active alumina column. Then, toluene was evaporated away to obtain a poly(n-butyl acrylate) macromonomer having an acryloyl group at one end.

The number average molecular weight of the macromonomer was 12,000 and the molecular weight distribution was 1.11.

Preparation Example 2

A poly(n-butyl acrylate) macromonomer having an acryloyl group at one end having a number average molecular weight of 6,000 and a molecular weight distribution of 1.14 was obtained in the same manner as in Preparation Example 1, except that the amount of methyl-2-bromopropionate used in Preparation Example 1 was 14.4 ml.

Example 1

Process for Preparing a Vinyl Chloride Copolymer Resin by Microsuspension Polymerization:

A 15-liter stainless steel polymerization reactor equipped with a jacket and a stirrer was degassed, and 99.95 parts of a vinyl chloride monomer was fed thereinto. Then, 0.05 part of the poly(n-butyl acrylate) macromonomer having an acryloyl group at one end in Preparation Example 1 was fed. For the purpose of dispersing and mixing the macromonomer in the vinyl chloride monomer, hot water was led through the jacket to increase the inner temperature of the polymerization reactor up to 30° C., and the contents in the reactor were stirred at a rotation speed of 200 rpm for 1 minute. Water was led through the jacket so as to cool the inside of the reactor to 20° C. or lower, and 0.07 part of 2,2'-azobis-(2,4-dimethylvaleronitrile) and 1.4 parts of stearyl alcohol were added thereto, and homogenized for 2 minutes. Then, an aqueous solution (300 parts) in which 1.16 parts of sodium laurylsulfate was previously dissolved was added to the polymerization reactor, and again homogenized for 3 minutes to obtain a monomer dispersion. Next, polymerization was conducted at 50° C. for about 6 hours. The unreacted vinyl chloride monomer in the polymerization reactor was recovered, the reactor was cooled, and the latex was collected. The evaluation result of the polymerization stability is shown in Table 1.

Example 2

Process for Preparing a Vinyl Chloride Copolymer Resin by Microsuspension Polymerization:

50 parts of the poly(n-butyl acrylate) macromonomer having an acryloyl group at one end in Preparation Example 1 was fed into a 15-liter stainless steel polymerization reactor equipped with a jacket and a stirrer, and degassed. Then, 50 parts of a vinyl chloride monomer was fed thereinto. For the purpose of dispersing and mixing the macromonomer in the vinyl chloride monomer, hot water was led through the jacket to increase the inner temperature of the polymerization reactor up to 40° C., and the contents in the reactor were stirred at a rotation speed of 200 rpm for 60 minutes. Water was led through the jacket so as to cool the inside of the reactor to 20° C. or lower, and 0.07 part of 2,2'-azobis-(2,4-dimethylvaleronitrile) and 1.4 parts of stearyl alcohol were added thereto, and homogenized for 2 minutes. Then, an aqueous solution (300 parts) in which 1.16 parts of sodium laurylsulfate was previously dissolved was added to the polymerization reactor, and again homogenized for 3 minutes to obtain a monomer dispersion. Next, polymerization was conducted at a polymerization temperature of 50° C. for about 6 hours. The unreacted vinyl chloride monomer in the polymerization reactor was recovered, the inside of the reactor was cooled, and the latex was collected. The evaluation result of the polymerization stability is shown in Table 1.

Example 3

Process for Preparing a Vinyl Chloride Copolymer Resin by Microsuspension Polymerization:

A 15-liter stainless steel polymerization reactor equipped with a jacket and a stirrer was degassed, and 50 parts of a vinyl chloride monomer and 50 parts of the poly(n-butyl acrylate) macromonomer having an acryloyl group at one end in Preparation Example 1 were simultaneously fed thereinto. For the purpose of dispersing and mixing the macromonomer in the vinyl chloride monomer, hot water was led through the jacket to increase the inner temperature of the polymerization reactor up to 40° C., and the contents in the reactor were stirred at a rotation speed of 200 rpm for 30 minutes. Water was led through the jacket so as to cool the inside of the reactor to 20° C. or lower, and 0.07 part of 2,2'-azobis-(2,4-dimethylvaleronitrile) and 1.4 parts of stearyl alcohol were added thereto, and homogenized for 2 minutes. Then, an aqueous solution (300 parts) in which 1.16 parts of sodium laurylsulfate was previously dissolved was added to the polymerization reactor, and again homogenized for 3 minutes to obtain a monomer dispersion. Next, polymerization was conducted at a polymerization temperature of 50° C. for about 6 hours. The unreacted vinyl chloride monomer in the polymerization reactor was recovered, the inside of the reactor was cooled, and the latex was collected. The evaluation result of the polymerization stability is shown in Table 1.

Example 4

Process for Preparing a Vinyl Chloride Copolymer Resin by Suspension Polymerization:

0.05 part of the poly(n-butyl acrylate) macromonomer having an acryloyl group at one end in Preparation Example 1 was fed into a 25-liter stainless steel polymerization reactor equipped with a jacket and a stirrer, and degassed. Then, 99.95 parts of a vinyl chloride monomer was fed thereinto. For the purpose of dispersing and mixing the macromonomer in the vinyl chloride monomer, hot water was led through the jacket to increase the inner temperature of the polymerization reactor up to 30° C., and the contents in the reactor were stirred at a rotation speed of 900 rpm for 1 minute. Water was led through the jacket so as to cool the inside of the reactor to 20° C. or lower, and 0.3 part of partially-saponified polyvinyl acetate having a saponification degree of about 88 mol % and an average polymerization degree of about 3500, 0.15 part of partially-saponified polyvinyl acetate having a saponification degree of about 78 mol % and an average polymerization degree of about 900, 0.02 part of hydroxypropylmethyl cellulose having a methoxyl group content of about 20%, a hydroxypropoxyl group content of about 8% and the viscosity of 2% aqueous solution at 20° C. of about 30,000 mPa·s, 0.6 part of n-butyl stearate, 0.02 part of t-butyl peroxyneodecanoate, and 0.02 part of 3,5,5-trimethylhexanoyl peroxide were fed thereinto. Next, 200 parts of hot water at 60° C. was fed thereinto, and polymerization was conducted at a polymerization temperature of 64° C. for about 6 hours. The unreacted vinyl chloride monomer in the polymerization reactor was recovered, the reactor was cooled, and the latex was collected. The evaluation result of the polymerization stability is shown in Table 1.

Example 5

Process for Preparing a Vinyl Chloride Copolymer Resin by Suspension Polymerization:

A 25-liter stainless steel polymerization reactor equipped with a jacket and a stirrer was degassed, and 50 parts of a vinyl chloride monomer was fed thereinto. Then, 50 parts of the poly(n-butyl acrylate) macromonomer having an acryloyl group at one end in Preparation Example 1 was fed. For the purpose of dispersing and mixing the macromonomer in the vinyl chloride monomer, hot water was led through the jacket to increase the inner temperature of the polymerization reactor up to 40° C., and the contents in the reactor were stirred at a rotation speed of 900 rpm for 60 minutes. Water was led through the jacket so as to cool the inside of the reactor to 20° C. or lower, and 0.3 part of partially-saponified polyvinyl acetate having a saponification degree of about 88 mol % and an average polymerization degree of about 3500, 0.15 part of partially-saponified polyvinyl acetate having a saponification degree of about 78 mol % and an average polymerization degree of about 900, 0.02 part of hydroxypropylmethyl cellulose having a methoxyl group content of about 20%, a hydroxypropoxyl group content of about 8% and the viscosity of 2% aqueous solution at 20° C. of about 30,000 mPa·s, 0.6 part of n-butyl stearate, 0.02 part of t-butyl peroxyneodecanoate, and 0.02 part of 3,5,5-trimethylhexanoyl peroxide were fed, and polymerization was conducted at a polymerization temperature of 64° C. for about 6 hours. The unreacted vinyl chloride monomer in the polymerization reactor was recovered, the reactor was cooled, and the latex was collected. The evaluation result of the polymerization stability is shown in Table 1.

Example 6

Process for Preparing a Vinyl Chloride Copolymer Resin by Suspension Polymerization:

A 25-liter stainless steel polymerization reactor equipped with a jacket and a stirrer was degassed, and 50 parts of a vinyl chloride monomer and 50 parts of the poly(n-butyl acrylate) macromonomer having an acryloyl group at one end in Preparation Example 1 were simultaneously fed thereinto. For the purpose of dispersing and mixing the macromonomer in the vinyl chloride monomer, hot water was led through the jacket to increase the inner temperature of the polymerization reactor up to 40° C., and the contents in the reactor were stirred at a rotation speed of 900 rpm for 30 minutes. Water was led through the jacket so as to cool the inside of the reactor to 20° C. or lower, and 0.3 part of partially-saponified polyvinyl acetate having a saponification degree of about 88 mol % and an average polymerization degree of about 3500, 0.15 part of partially-saponified polyvinyl acetate having a saponification degree of about 78 mol % and an average polymerization degree of about 900, 0.02 part of hydroxypropylmethyl cellulose having a methoxyl group content of about 20%, a hydroxypropoxyl group content of about 8% and the viscosity of 2% aqueous solution at 20° C. of about 30,000 mPa·s, 0.6 part of n-butyl stearate, 0.02 part of t-butyl peroxyneodecanoate, and 0.02 part of 3,5,5-trimethylhexanoyl peroxide were fed thereinto. Next, 200 parts of hot water at 60° C. was fed, and polymerization was conducted at a polymerization temperature of 64° C. for about 6 hours. The unreacted vinyl chloride monomer in the polymerization reactor was recovered, the reactor was cooled, and the latex was collected. The evaluation result of the polymerization stability is shown in Table 1.

Example 7

Process for Preparing a Vinyl Chloride Copolymer Resin by Suspension Polymerization:

0.05 part of the poly(n-butyl acrylate) macromonomer having an acryloyl group at one end in Preparation Example 1 was fed into a 25-liter stainless steel polymerization reactor equipped with a jacket and a stirrer, and the reactor was degassed. Then, 99.95 parts of a vinyl chloride monomer was fed thereinto. For the purpose of dispersing and mixing the macromonomer in the vinyl chloride monomer, hot water was led through the jacket to increase the inner temperature of the polymerization reactor up to 30° C., and the contents in the reactor were stirred at a rotation speed of 900 rpm for 1 minute. Water was led through the jacket so as to cool the inside of the reactor to 20° C. or lower, and 0.05 part of partially-saponified polyvinyl acetate having a saponification degree of about 80 mol % and an average polymerization degree of about 2000, 0.005 part of polyethylene oxide having an average molecular weight of about 4,500,000, 0.03 part of t-butyl peroxyneodecanoate, and 0.01 part of 1,1,3,3-tetramethylbutyl peroxyneodecanoate were fed thereinto. Next, 150 parts of hot water at 60° C. was fed thereinto, and polymerization was conducted at a polymerization temperature of 57° C. for about 6 hours. The unreacted vinyl chloride monomer in the polymerization reactor was recovered, the reactor was cooled, and the slurry was collected. The evaluation result of the polymerization stability is shown in Table 1.

Example 8

Process for Preparing a Vinyl Chloride Copolymer Resin by Suspension Polymerization:

50 parts of the poly(n-butyl acrylate) macromonomer having an acryloyl group at one end in Preparation Example 1 was fed into a 25-liter stainless steel polymerization reactor equipped with a jacket and a stirrer, and degassed. Then, 50 parts of a vinyl chloride monomer was fed thereinto. For the purpose of dispersing and mixing the macromonomer in the vinyl chloride monomer, hot water was led through the jacket to increase the inner temperature of the polymerization reactor up to 40° C., and the contents in the reactor were stirred at a rotation speed of 900 rpm for 60 minutes. Water was led through the jacket so as to cool the inside of the reactor to 20° C. or lower, and 0.05 part of partially-saponified polyvinyl acetate having a saponification degree of about 80 mol % and an average polymerization degree of about 2000, 0.005 part of polyethylene oxide having an average molecular weight of about 4,500,000, 0.03 part of t-butyl peroxyneodecanoate, and 0.01 part of 1,1,3,3-tetramethylbutyl peroxyneodecanoate were fed thereinto. Next, 150 parts of hot water at 60° C. was fed, and polymerization was conducted at a polymerization temperature of 57° C. for about 6 hours. The unreacted vinyl chloride monomer in the polymerization reactor was recovered, the reactor was cooled, and the slurry was collected. The evaluation result of the polymerization stability is shown in Table 1.

Example 9

Process for Preparing a Vinyl Chloride Copolymer Resin by Suspension Polymerization:

A 25-liter stainless steel polymerization reactor equipped with a jacket and a stirrer was degassed, and 50 parts of a vinyl chloride monomer and 50 parts of the poly(n-butyl acrylate) macromonomer having an acryloyl group at one end in Preparation Example 1 were simultaneously fed thereinto. For the purpose of dispersing and mixing the macromonomer in the vinyl chloride monomer, hot water was led through the jacket to increase the inner temperature of the polymerization reactor up to 40° C., and the contents in the reactor were stirred at a rotation speed of 900 rpm for 30 minutes. Water was led through the jacket so as to cool the inside of the reactor to 20° C. or lower, and 0.05 part of partially-saponified polyvinyl acetate having a saponification degree of about 80 mol % and an average polymerization degree of about 2000, 0.005 part of polyethylene oxide having an average molecular weight of about 4,500,000, 0.03 part of t-butyl peroxyneodecanoate, and 0.01 part of 1,1,3,3-tetramethylbutyl peroxyneodecanoate were fed thereinto. Next, 150 parts of hot water at 60° C. was fed, and polymerization was conducted at a polymerization temperature of 57° C. for about 6 hours. The unreacted vinyl chloride monomer in the polymerization reactor was recovered, the reactor was cooled, and the slurry was collected. The evaluation result of the polymerization stability is shown in Table 1.

Example 10

Process for Preparing a Vinyl Chloride Copolymer Resin by Suspension Polymerization:

50 parts of the poly(n-butyl acrylate) macromonomer having an acryloyl group at one end in Preparation Example 1 was fed into a 15-liter stainless steel pressure vessel equipped with a jacket and a stirrer, and degassed. Then, 50 parts of a vinyl chloride monomer was fed thereinto. For the purpose of dispersing and mixing the macromonomer in the vinyl chloride monomer, hot water was led through the jacket to increase the inner temperature of the pressure vessel up to 40° C., and the contents of the vessel were stirred at a rotation speed of 450 rpm for 60 minutes. Water was led through the jacket so as to cool the inside of the pressure vessel to 20° C. or lower, and then all the contents were transferred into a previously-degassed 25-liter stainless steel polymerization reactor equipped with a jacket and a stirrer. Then, 0.05 part of partially-saponified polyvinyl acetate having a saponification degree of about 80 mol % and an average polymerization degree of about 2000, 0.005 part of polyethylene oxide having an average molecular weight of about 4,500,000, 0.03 part of t-butyl peroxyneodecanoate, and 0.01 part of 1,1,3,3-tetramethylbutyl peroxyneodecanoate were fed into the polymerization reactor. Next, 150 parts of hot water at 60° C. was fed thereinto, and polymerization was conducted at a polymerization temperature of 57° C. for about 6 hours. The unreacted vinyl chloride monomer in the polymerization reactor was recovered, the reactor was cooled, and the slurry was collected. The evaluation result of the polymerization stability is shown in Table 1.

Comparative Example 1

Process for Preparing a Vinyl Chloride Copolymer Resin by Microsuspension Polymerization:

A vinyl chloride monomer and the poly(n-butyl acrylate) macromonomer having an acryloyl group at one end in Preparation Example 1 were polymerized and then the resultant latex was collected in the same manner as in Example 1, except that heating the inside of the polymerization reactor and stirring the contents in the reactor for the purpose of dispersing and mixing the macromonomer in the vinyl chloride monomer was not conducted after the vinyl chloride monomer and the macromonomer were fed into the reactor. The evaluation result of the polymerization stability is shown in Table 1. Herein, the inner temperature of the polymerization reactor was about 17° C. after the vinyl chloride monomer and the poly(n-butyl acrylate) macromonomer having an acryloyl group at one end were fed into the reactor.

Some scales were acknowledgingly deposited inside the polymerization reactor.

Comparative Example 2

Process for Preparing a Vinyl Chloride Copolymer Resin by Microsuspension Polymerization:

The poly(n-butyl acrylate) macromonomer having an acryloyl group at one end in Preparation Example 1 and a vinyl chloride monomer were polymerized and the resultant latex was collected in the same manner as in Example 2, except that the inside of the polymerization reactor was not heated for the purpose of dispersing and mixing the macromonomer in the vinyl chloride monomer after the macromonomer and the vinyl chloride monomer were fed into the reactor and the contents were stirred at a rotation speed of 200 rpm for 60 minutes. The evaluation result of the polymerization stability is shown in Table 1. Herein, the inner temperature of the polymerization reactor was about 18° C. while the contents in the reactor were stirred at a rotation speed of 200 rpm for 60 minutes.

A significant amount of scales were acknowledgingly deposited inside the polymerization reactor. In addition, the poly(n-butyl acrylate) macromonomer having an acryloyl group at one end not dispersed and mixed in the vinyl chloride monomer was acknowledgingly deposited on the inner wall of the polymerization reactor and existed in the latex.

Comparative Example 3

Process for Preparing a Vinyl Chloride Copolymer Resin by Microsuspension Polymerization:

The poly(n-butyl acrylate) macromonomer having an acryloyl group at one end in Preparation Example 1 and a vinyl chloride monomer were polymerized and the resultant latex was collected in the same manner as in Example 2, except that hot water was led through the jacket to elevate the inner temperature of the polymerization reactor up to 40° C. and the contents in the reactor were stirred at a rotation speed of 200 rpm for 30 seconds for the purpose of dispersing and mixing the macromonomer in the vinyl chloride monomer after the macromonomer and the vinyl chloride monomer were fed into the reactor. The evaluation result of the polymerization stability is shown in Table 1.

A significant amount of scales were acknowledgingly deposited inside the polymerization reactor. In addition, the poly(n-butyl acrylate) macromonomer having an acryloyl group at one end not dispersed and mixed in the vinyl chloride monomer was acknowledgingly deposited on the inner wall of the polymerization reactor and existed in the latex.

Comparative Example 4

Process for Preparing a Vinyl Chloride Copolymer Resin by Microsuspension Polymerization:

A vinyl chloride monomer and the poly(n-butyl acrylate) macromonomer having an acryloyl group at one end in Preparation Example 1 were polymerized and the resultant latex was collected in the same manner as in Example 3, except that the inside of the polymerization reactor was not heated for the purpose of dispersing and mixing the macromonomer in the vinyl chloride monomer after the macromonomer and the vinyl chloride monomer were fed into the reactor and the contents were stirred at a rotation speed of 200 rpm for 30 minutes. The evaluation result of the polymerization stability is shown in Table 1. Herein, the inner temperature of the polymerization reactor was about 17° C. while the contents in the reactor were stirred at a rotation speed of 200 rpm for 30 minutes.

A significant amount of scales were acknowledgingly deposited inside the polymerization reactor. In addition, the poly(n-butyl acrylate) macromonomer having an acryloyl group at one end not dispersed and mixed in the vinyl chloride monomer was acknowledgingly deposited on the inner wall of the polymerization reactor and existed in the latex.

Comparative Example 5

Process for Preparing a Vinyl Chloride Copolymer Resin by Microsuspension Polymerization:

A vinyl chloride monomer and the poly(n-butyl acrylate) macromonomer having an acryloyl group at one end in Preparation Example 1 were polymerized and the resultant latex was collected in the same manner as in Example 3, except that hot water was led through the jacket to elevate the inner temperature of the polymerization reactor up to 40° C. and the contents in the reactor were stirred at a rotation speed of 200 rpm for 30 seconds for the purpose of dispersing and mixing the macromonomer in the vinyl chloride monomer after the macromonomer and the vinyl chloride monomer were fed into the reactor. The evaluation result of the polymerization stability is shown in Table 1.

A significant amount of scales were acknowledgingly deposited inside the polymerization reactor. In addition, the poly(n-butyl acrylate) macromonomer having an acryloyl group at one end not dispersed and mixed in the vinyl chloride monomer was acknowledgingly deposited on the inner wall of the polymerization reactor and existed in the latex.

Comparative Example 6

Process for Preparing a Vinyl Chloride Copolymer Resin by Suspension Polymerization:

The poly(n-butyl acrylate) macromonomer having an acryloyl group at one end in Preparation Example 1 and vinyl chloride monomer were polymerized and the resultant latex was collected in the same manner as in Example 4, except that heating the inside of the polymerization reactor and stirring the contents in the reactor for the purpose of dispersing and mixing the macromonomer in the vinyl chloride monomer was not conducted after the vinyl chloride monomer and the macromonomer were fed into the reactor. The evaluation result of the polymerization stability is shown in Table 1. Herein, the inner temperature of the polymerization reactor was about 15° C. after the vinyl chloride monomer and the poly(n-butyl acrylate) macromonomer having an acryloyl group at one end were fed thereinto.

Some scales were acknowledgingly deposited inside the polymerization reactor.

Comparative Example 7

Process for Preparing a Vinyl Chloride Copolymer Resin by Suspension Polymerization:

A vinyl chloride monomer and the poly(n-butyl acrylate) macromonomer having an acryloyl group at one end in Preparation Example 1 were polymerized and the resultant latex was collected in the same manner as in Example 5, except that the inside of the polymerization reactor was not heated for the purpose of dispersing and mixing the macromonomer in the vinyl chloride monomer after the macromonomer and the vinyl chloride monomer were fed into the reactor and the contents were stirred at a rotation speed of 900 rpm for 60 minutes. The evaluation result of the polymerization stability is shown in Table 1. Herein, the inner temperature of the polymerization reactor was about 16° C. while the contents in the reactor were stirred at a rotation speed of 900 rpm for 60 minutes.

A significant amount of scales were acknowledgingly deposited inside the polymerization reactor. In addition, the poly(n-butyl acrylate) macromonomer having an acryloyl group at one end not dispersed and mixed in the vinyl chloride monomer was acknowledgingly deposited on the inner wall of the polymerization reactor and existed in the latex.

Comparative Example 8

Process for Preparing a Vinyl Chloride Copolymer Resin by Suspension Polymerization:

A vinyl chloride monomer and the poly(n-butyl acrylate) macromonomer having an acryloyl group at one end in Preparation Example 1 were polymerized and the resultant latex was collected in the same manner as in Example 5, except that hot water was led through the jacket to elevate the inner temperature of the polymerization reactor up to 40° C. and the contents in the reactor were stirred at a rotation speed of 900 rpm for 30 seconds for the purpose of dispersing and mixing the macromonomer in the vinyl chloride monomer after the macromonomer and the vinyl chloride monomer were fed into the reactor. The evaluation result of the polymerization stability is shown in Table 1.

A significant amount of scales were acknowledgingly deposited inside the polymerization reactor. In addition, the poly(n-butyl acrylate) macromonomer having an acryloyl group at one end not dispersed and mixed in the vinyl chloride monomer was acknowledgingly deposited on the inner wall of the polymerization reactor and existed in the latex.

Comparative Example 9

Process for Preparing a Vinyl Chloride Copolymer Resin by Suspension Polymerization:

A vinyl chloride monomer and the poly(n-butyl acrylate) macromonomer having an acryloyl group at one end in Preparation Example 1 were polymerized and the resultant latex was collected in the same manner as in Example 6, except that the inside of the polymerization reactor was not heated for the purpose of dispersing and mixing the macromonomer in the vinyl chloride monomer after the macromonomer and the vinyl chloride monomer were fed into the reactor and the contents were stirred at a rotation speed of 900 rpm for 30 minutes. The evaluation result of the polymerization stability is shown in Table 1. Herein, the inner temperature of the polymerization reactor was about 15° C. while the contents in the reactor were stirred at a rotation speed of 200 rpm for 30 minutes.

A significant amount of scales were acknowledgingly deposited inside the polymerization reactor. In addition, the poly(n-butyl acrylate) macromonomer having an acryloyl group at one end not dispersed and mixed in the vinyl chloride monomer was acknowledgingly deposited on the inner wall of the polymerization reactor and existed in the latex.

Comparative Example 10

Process for Preparing a Vinyl Chloride Copolymer Resin by Suspension Polymerization:

Vinyl chloride monomer and the poly(n-butyl acrylate) macromonomer having an acryloyl group at one end in Preparation Example 1 were polymerized and the resultant latex was collected in the same manner as in Example 6, except that hot water was led through the jacket to elevate the inner temperature of the polymerization reactor up to 40° C. and the contents in the reactor were stirred at a rotation speed of 900 rpm for 30 seconds for the purpose of dispersing and mixing the macromonomer in the vinyl chloride monomer after the macromonomer and the vinyl chloride monomer were fed into the reactor. The evaluation result of the polymerization stability is shown in Table 1.

A significant amount of scales were acknowledgingly deposited inside the polymerization reactor. In addition, the poly(n-butyl acrylate) macromonomer having an acryloyl group at one end not dispersed and mixed in the vinyl chloride monomer was acknowledgingly deposited on the inner wall of the polymerization reactor and existed in the latex.

Comparative Example 11

Process for Preparing a Vinyl Chloride Copolymer Resin by Suspension Polymerization:

The poly(n-butyl acrylate) macromonomer having an acryloyl group at one end in Preparation Example 1 and a vinyl chloride monomer were polymerized and the resultant slurry was collected in the same manner as in Example 7, except that heating the inside of the polymerization reactor and stirring the contents in the reactor for the purpose of dispersing and mixing the macromonomer in the vinyl chloride monomer was not conducted after the vinyl chloride monomer and the macromonomer were fed into the reactor. The evaluation result of the polymerization stability is shown in Table 1. Herein, the inner temperature of the polymerization reactor was about 13° C. after the vinyl chloride monomer and the poly(n-butyl acrylate) macromonomer having an acryloyl group at one end in the Preparation Example were fed thereinto.

Some scales were acknowledgingly deposited inside the polymerization reactor.

Comparative Example 12

Process for Preparing a Vinyl Chloride Copolymer Resin by Suspension Polymerization:

The poly(n-butyl acrylate) macromonomer having an acryloyl group at one end in Preparation Example 1 and a vinyl chloride monomer were polymerized and the resultant slurry was collected in the same manner as in Example 8, except that the inside of the polymerization reactor was not heated for the purpose of dispersing and mixing the macromonomer in the vinyl chloride monomer after the macromonomer and the vinyl chloride monomer were fed into the reactor and the contents were stirred at a rotation speed of 900 rpm for 60 minutes. The evaluation result of the polymerization stability is shown in Table 1. Herein, the inner temperature of the polymerization reactor was about 14° C. while the contents in the reactor were stirred at a rotation speed of 900 rpm for 60 minutes.

A significant amount of scales were acknowledgingly deposited inside the polymerization reactor. In addition, the poly(n-butyl acrylate) macromonomer having an acryloyl group at one end not dispersed and mixed in the vinyl chloride monomer was acknowledgingly deposited on the inner wall of the polymerization reactor and existed in the slurry.

Comparative Example 13

Process for Preparing a Vinyl Chloride Copolymer Resin by Suspension Polymerization:

The poly(n-butyl acrylate) macromonomer having an acryloyl group at one end in Preparation Example 1 and a vinyl chloride monomer were polymerized and the resultant slurry was collected in the same manner as in Example 8, except that hot water was led through the jacket to elevate the inner temperature of the polymerization reactor up to 40° C. and the contents in the reactor were stirred at a rotation speed of 900 rpm for 30 seconds for the purpose of dispersing and mixing the macromonomer in the vinyl chloride monomer after the macromonomer and the vinyl chloride monomer were fed into the reactor. The evaluation result of the polymerization stability is shown in Table 1.

A significant amount of scales were acknowledgingly deposited inside the polymerization reactor. In addition, the poly(n-butyl acrylate) macromonomer having an acryloyl group at one end not dispersed and mixed in the vinyl chloride monomer was acknowledgingly deposited on the inner wall of the polymerization reactor and existed in the slurry.

Comparative Example 14

Process for Preparing a Vinyl Chloride Copolymer Resin by Suspension Polymerization:

Polymerization of a vinyl chloride monomer and the poly(n-butyl acrylate) macromonomer having an acryloyl group at one end in Preparation Example 1 were tried in the same manner as in Example 9, except that the inside of the polymerization reactor was not heated for the purpose of dispersing and mixing the macromonomer in the vinyl chloride monomer after the macromonomer and the vinyl chloride monomer were fed into the reactor and the contents were stirred at a rotation speed of 900 rpm for 30 minutes. However, this resulted in an abnormal polymerization. The poly(n-butyl acrylate) macromonomer having an acryloyl group at one end not dispersed and mixed in the vinyl chloride monomer was acknowledgingly deposited inside the polymerization reactor. The inner temperature of the polymerization reactor was about 13° C. while the contents in the reactor were stirred at a rotation speed of 900 rpm for 30 minutes.

Comparative Example 15

Process for Preparing a Vinyl Chloride Copolymer Resin by Suspension Polymerization:

Polymerization of a vinyl chloride monomer and the poly(n-butyl acrylate) macromonomer having an acryloyl group at one end in Preparation Example 1 was tried in the same manner as in Example 9, except that hot water was led through the jacket to elevate the inner temperature of the polymerization reactor up to 40° C. and the contents in the reactor were stirred at a rotation speed of 900 rpm for 30 seconds for the purpose of dispersing and mixing the macromonomer in the vinyl chloride monomer after the macromonomer and the vinyl chloride monomer were fed into the reactor. However, this resulted in an abnormal polymerization. The poly(n-butyl acrylate) macromonomer having an acryloyl group at one end not dispersed and mixed in the vinyl chloride monomer was acknowledgingly deposited inside the polymerization reactor.

Comparative Example 16

Process for Preparing a Vinyl Chloride Copolymer Resin by Suspension Polymerization:

The poly(n-butyl acrylate) macromonomer having an acryloyl group at one end in Preparation Example 1 and a vinyl chloride monomer were polymerized and the resultant slurry was collected in the same manner as in Example 10, except that the inside of the polymerization reactor was not heated for the purpose of dispersing and mixing the macromonomer in the vinyl chloride monomer after the macromonomer and the vinyl chloride monomer were fed into the pressure vessel and the contents were stirred at a rotation speed of 450 rpm for 60 minutes. The evaluation result of the polymerization stability is shown in Table 1. Herein, the inner temperature of the polymerization reactor was about 12° C. while the contents in the reactor were stirred at a rotation speed of 450 rpm for 60 minutes.

Some scales were acknowledgingly deposited inside the polymerization reactor. In addition, the poly(n-butyl acrylate)

macromonomer having an acryloyl group at one end not dispersed and mixed in the vinyl chloride monomer was acknowledgingly deposited on the inner wall of the pressure vessel and existed in the slurry.

Example 11

0.05 part of partially-saponified polyvinyl alcohol having a saponification degree of about 80 mol % and an average polymerization degree of about 2000, 0.005 part of polyethylene oxide having an average molecular weight of about 4,500,000, 0.03 part of t-butyl peroxyneodecanoate, and 0.01 part of 1,1,3,3-tetramethylbutyl peroxyneodecanoate were fed into a 25-liter stainless steel polymerization reactor equipped with a jacket and a stirrer, and degassed. Next, 99.95 parts of a vinyl chloride monomer and 0.05 part of the poly(n-butyl acrylate) macromonomer having an acryloyl group at one end in Preparation Example 1 were fed thereinto. Then, 120 parts of hot water at 60° C. was fed, and polymerization was conducted at a polymerization temperature of 57° C. for about 6 hours. The unreacted monomer in the polymerization reactor was recovered, the reactor was cooled, and a slurry was collected. The resulting slurry was dewatered and dried in a hot air drier at 55° C. for 24 hours to obtain a vinyl chloride polymer resin powder A.

The resin powder A thus obtained was evaluated in point of mean particle size, bulk specific gravity, surface roughness and powdery flowability. The results are shown in Table 2.

Example 12

In the same manner as in Example 7, 0.05 part of the poly(n-butyl acrylate) macromonomer having an acryloyl group at one end in Preparation Example 1 was fed into a 25-liter stainless steel polymerization reactor equipped with a jacket and a stirrer, and degassed. Then, 99.95 parts of a vinyl chloride monomer was fed thereinto. For the purpose of dispersing and mixing the macromonomer in the vinyl chloride monomer, hot water was led through the jacket to increase the inner temperature of the polymerization reactor up to 30° C., and the contents in the reactor were stirred at a rotation speed of 900 rpm for 1 minute. Water was led through the jacket so as to cool the inside of the reactor to 20° C. or lower, and 0.05 part of partially-saponified polyvinyl acetate having a saponification degree of about 80 mol % and an average polymerization degree of about 2000, 0.005 part of polyethylene oxide having an average molecular weight of about 4,500,000, 0.03 part of t-butyl peroxyneodecanoate, and 0.01 part of 1,1,3,3-tetramethylbutyl peroxyneodecanoate were fed into the reactor. Next, 150 parts of hot water at 60° C. was fed thereinto, and polymerization was conducted at a polymerization temperature of 57° C. for about 6 hours. The step of recovering the unreacted monomer in the polymerization reactor and the steps thereafter were conducted in the same manner as in Example 11, and a vinyl chloride polymer resin powder A-1 was obtained.

The resin powder A-1 thus obtained was evaluated in point of mean particle size, bulk specific gravity, surface roughness and powdery flowability. The results are shown in Table 3. In the case where the vinyl chloride monomer and the macromonomer were dispersed and mixed at a temperature of 20° C. to 60° C. for at least 1 minute, and then copolymerization was initiated in the experiment of Example 11, the same effect was obtained.

Example 13

99.5 parts of a vinyl chloride monomer and 0.5 part of the poly(n-butyl acrylate) macromonomer having an acryloyl group at one end in Preparation Example 2 were polymerized, dewatered and dried in the same manner as in Example 11 to obtain a vinyl chloride polymer resin powder J.

The resin powder J thus obtained was evaluated in point of mean particle size, bulk specific gravity, surface roughness and powdery flowability. The results are shown in Table 2.

Example 14

99.5 parts of a vinyl chloride monomer and 0.5 part of the poly(n-butyl acrylate) macromonomer having an acryloyl group at one end in Preparation Example 2 were polymerized, dewatered and dried in the same manner as in Example 12 to obtain a vinyl chloride polymer resin powder J-1.

The resin powder J-1 thus obtained was evaluated in point of mean particle size, bulk specific gravity, surface roughness and powdery flowability. The results are shown in Table 3. In the case where the vinyl chloride monomer and the macromonomer were dispersed and mixed at a temperature being 20° C. to 60° C. for at least 1 minute, and then copolymerization was initiated in the experiment of Example 13, the same result was obtained.

Example 15

99 parts of a vinyl chloride monomer and 1 part of the poly(n-butyl acrylate) macromonomer having an acryloyl group at one end in Preparation Example 2 were polymerized, dewatered and dried in the same manner as in Example 11 to obtain a vinyl chloride polymer resin powder B.

The resin powder B thus obtained was evaluated in point of mean particle size, bulk specific gravity, surface roughness and powdery flowability. The results are shown in Table 2.

Example 16

99 parts of a vinyl chloride monomer and 1 part of the poly(n-butyl acrylate) macromonomer having an acryloyl group at one end in Preparation Example 2 were polymerized, dewatered and dried in the same manner as in Example 12 to obtain a vinyl chloride polymer resin powder B-1.

The resin powder B-1 thus obtained was evaluated in point of mean particle size, bulk specific gravity, surface roughness and powdery flowability. The results are shown in Table 3. In the case where the vinyl chloride monomer and the macromonomer were dispersed and mixed at a temperature of 20° C. to 60° C. for at least 1 minute, and then copolymerization was initiated in the experiment of Example 15, the same effect was obtained.

Example 17

90 parts of a vinyl chloride monomer and 10 parts of the poly(n-butyl acrylate) macromonomer having an acryloyl group at one end in Preparation Example 1 were polymerized, dewatered and dried in the same manner as in Example 11 to obtain a vinyl chloride polymer resin powder K.

The resin powder K thus obtained was evaluated in point of mean particle size, bulk specific gravity, surface roughness and powdery flowability. The results are shown in Table 2.

Example 18

90 parts of a vinyl chloride monomer and 10 parts of the poly(n-butyl acrylate) macromonomer having an acryloyl group at one end in Preparation Example 1 were polymerized, dewatered and dried in the same manner as in Example 12 to obtain a vinyl chloride polymer resin powder K-1.

The resin powder K-1 thus obtained was evaluated in point of mean particle size, bulk specific gravity, surface roughness and powdery flowability. The results are shown in Table 3. In the case where the vinyl chloride monomer and the macromonomer were dispersed and mixed at a temperature of 20° C. to 60° C. for at least 1 minute, and then copolymerization was initiated in the experiment of Example 17, the same effect was obtained.

Example 19

60 parts of a vinyl chloride monomer and 40 parts of the poly(n-butyl acrylate) macromonomer having an acryloyl group at one end in Preparation Example 1 were polymerized, dewatered and dried in the same manner as in Example 11 to obtain a vinyl chloride polymer resin powder L.

The resin powder L thus obtained was evaluated in point of mean particle size, bulk specific gravity, surface roughness and powdery flowability. The results are shown in Table 2.

Example 20

60 parts of a vinyl chloride monomer and 40 parts of the poly(n-butyl acrylate) macromonomer having an acryloyl group at one end in Preparation Example 1 were polymerized, dewatered and dried in the same manner as in Example 12 to obtain a vinyl chloride polymer resin powder L-1.

The resin powder L-1 thus obtained was evaluated in point of mean particle size, bulk specific gravity, surface roughness and powdery flowability. The results are shown in Table 3. In the case where the vinyl chloride monomer and the macromonomer were dispersed and mixed at a temperature of 20° C. to 60° C. for at least 1 minute, and then copolymerization was initiated in the experiment of Example 19, the same effect was obtained.

Example 21

99.95 parts of a vinyl chloride monomer, 0.05 part of the poly(n-butyl acrylate) macromonomer having an acryloyl group at one end in Preparation Example 2, 0.03 part of t-butyl peroxyneodecanoate, 0.12 part of hydroxypropylmethyl cellulose having a methoxyl group content of 21%, a hydroxypropoxyl group content of 8% and the viscosity of 2% aqueous solution at 20° C. of about 30,000 mPa·s, 0.13 part of sodium dodecylbenzenesulfonate and 160 parts of degassed pure water were put into a 20-liter pressure vessel that had been fully degassed and purged with nitrogen. With stirring, the polymerization was initiated while the inside of the vessel was kept at 54.5° C. When the pressure in the vessel began to lower after about 5 hours, the monomer in the polymerization reactor was recovered, the inside of the vessel was cooled, and the resultant slurry was collected (The conversion ratio of the vinyl chloride monomer was about 90%.). After dewatered through centrifugation, the slurry was dried with being fluidized at 60° C. to obtain a vinyl chloride polymer resin powder C.

The resin powder thus obtained was evaluated in point of mean particle size, bulk specific gravity, surface roughness and powdery flowability. The results are shown in Table 4.

Example 22

0.05 part of the poly(n-butyl acrylate) macromonomer having an acryloyl group at one end in Preparation Example 2 was put into a 20-liter pressure vessel that had been fully degassed and purged with nitrogen, and then degassed. 99.95 parts of a vinyl chloride monomer was fed thereinto. Hot water was led through the jacket to elevate the temperature of the polymerization reactor up to 40° C. and the contents in the reactor were stirred at a rotation speed of 900 rpm for 60 minutes for the purpose of dispersing and mixing the macromonomer in the vinyl chloride monomer. Water was led through the jacket to lower the inner temperature of the polymerization reactor to 20° C. or lower, and then 0.03 part of t-butyl peroxyneodecanoate, 0.12 part of hydroxypropylmethyl cellulose having a methoxyl group content of 21%, a hydroxypropoxyl group content of 8% and the viscosity of 2% aqueous solution at 20° C. of about 30,000 mPa·s, 0.13 part of sodium dodecylbenzenesulfonate and 160 parts of degassed pure water were added to the reactor. With stirring, the polymerization was initiated while the inside of the vessel was kept at 54.5° C. The subsequent steps after the pressure in the vessel began to lower after about 5 hours were conducted in the same manner as in Example 21 to obtain a vinyl chloride polymer resin powder C-1.

The resin powder C-1 thus obtained was evaluated in point of mean particle size, bulk specific gravity, surface roughness and powdery flowability. The results are shown in Table 5. In the case where the vinyl chloride monomer and the macromonomer were dispersed and mixed at a temperature of 20° C. to 60° C. for at least 1 minute, and then copolymerization was initiated in the experiment of Example 21, the same effect was obtained.

Example 23

99.5 parts of a vinyl chloride monomer and 0.5 part of the poly(n-butyl acrylate) macromonomer having an acryloyl group at one end in Preparation Example 1 were polymerized, dewatered and dried in the same manner as in Example 21 to obtain a vinyl chloride polymer resin powder M.

The resin powder M thus obtained was evaluated in point of mean particle size, bulk specific gravity, surface roughness and powdery flowability. The results are shown in Table 4.

Example 24

99.5 parts of a vinyl chloride monomer and 0.5 part of the poly(n-butyl acrylate) macromonomer having an acryloyl group at one end in Preparation Example 1 were polymerized, dewatered and dried in the same manner as in Example 22 to obtain a vinyl chloride polymer resin powder M-1.

The resin powder M-1 thus obtained was evaluated in point of mean particle size, bulk specific gravity, surface roughness and powdery flowability. The results are shown in Table 5. In the case where the vinyl chloride monomer and the macromonomer were dispersed and mixed at a temperature of 20° C. to 60° C. for at least 1 minute, and then copolymerization was initiated in the experiment of Example 23, the same effect was obtained.

Example 25

99 parts of a vinyl chloride monomer and 1 part of the poly(n-butyl acrylate) macromonomer having an acryloyl group at one end in Preparation Example 1 were polymerized, dewatered and dried in the same manner as in Example 21 to obtain a vinyl chloride polymer resin powder D.

The resin powder D thus obtained was evaluated in point of mean particle size, bulk specific gravity, surface roughness and powdery flowability. The results are shown in Table 4.

Example 26

99 parts of a vinyl chloride monomer and 1 part of the poly(n-butyl acrylate) macromonomer having an acryloyl group at one end in Preparation Example 1 were polymerized, dewatered and dried in the same manner as in Example 22 to obtain a vinyl chloride polymer resin powder D-1.

The resin powder D-1 thus obtained was evaluated in point of mean particle size, bulk specific gravity, surface roughness and powdery flowability. The results are shown in Table 5. In the case where the vinyl chloride monomer and the macromonomer were dispersed and mixed at a temperature of 20° C. to 60° C. for at least 1 minute, and then copolymerization was initiated in the experiment of Example 25, the same effect was obtained.

Example 27

94 parts of a vinyl chloride monomer and 6 parts of the poly(n-butyl acrylate) macromonomer having an acryloyl group at one end in Preparation Example 1 were polymerized, dewatered and dried in the same manner as in Example 21 to obtain a vinyl chloride polymer resin powder N.

The resin powder N thus obtained was evaluated in point of mean particle size, bulk specific gravity, surface roughness and powdery flowability. The results are shown in Table 4.

Example 28

94 parts of a vinyl chloride monomer and 6 parts of the poly(n-butyl acrylate) macromonomer having an acryloyl group at one end in Preparation Example 1 were polymerized, dewatered and dried in the same manner as in Example 22 to obtain a vinyl chloride polymer resin powder N-1.

The resin powder N-1 thus obtained was evaluated in point of mean particle size, bulk specific gravity, surface roughness and powdery flowability. The results are shown in Table 5. In the case where the vinyl chloride monomer and the macromonomer were dispersed and mixed at a temperature of 20° C. to 60° C. for at least 1 minute, and then copolymerization was initiated in the experiment of Example 27, the same effect was obtained.

Example 29

80 parts of a vinyl chloride monomer and 20 parts of the poly(n-butyl acrylate) macromonomer having an acryloyl group at one end in Preparation Example 2 were polymerized, dewatered and dried in the same manner as in Example 21 to obtain a vinyl chloride polymer resin powder O.

The resin powder O thus obtained was evaluated in point of mean particle size, surface roughness and powdery flowability. The results are shown in Table 4.

Example 30

80 parts of a vinyl chloride monomer and 20 parts of the poly(n-butyl acrylate) macromonomer having an acryloyl group at one end in Preparation Example 2 were polymerized, dewatered and dried in the same manner as in Example 22 to obtain a vinyl chloride polymer resin powder O-1.

The resin powder O-1 thus obtained was evaluated in point of mean particle size, surface roughness and powdery flowability. The results are shown in Table 5. In the case where the vinyl chloride monomer and the macromonomer were dispersed and mixed at a temperature of 20° C. to 60° C. for at least 1 minute, and then copolymerization was initiated in the experiment of Example 29, the same effect was obtained.

Example 31

99.95 parts of a vinyl chloride monomer, 0.05 part of the poly(n-butyl acrylate) macromonomer having an acryloyl group at one end in Preparation Example 2, 0.07 part of α,α'-azobis-2,4-dimethylvaleronitrile, and 1.4 parts of stearyl alcohol were put into a 15-liter pressure vessel that had been fully degassed and purged with nitrogen, and then homogenized for 2 minutes. 300 parts of an aqueous solution in which 1.17 parts of sodium laurylsulfate was previously dissolved was added to the vessel, and again homogenization was carried out again for 3 minutes to obtain a monomer dispersion. The monomer dispersion was transferred into a 5-liter reactor, and polymerization was initiated while the inside of the reactor was kept heated at 50° C. When the pressure in the reactor began to lower after about 6 hours, the monomer in the polymerization reactor was recovered, the vessel was cooled inside, and the resultant latex was collected (The conversion ratio of the vinyl chloride monomer was about 90%.). The latex was dried by a spray-type drier (inlet 110° C./outlet 50° C.) to obtain a vinyl chloride polymer resin powder E.

The resin powder E thus obtained was evaluated in point of mean particle size, surface roughness and powdery flowability. The results are shown in Table 6.

Example 32

0.05 part of the poly(n-butyl acrylate) macromonomer having an acryloyl group at one end in Preparation Example 2 was put into a 15-liter pressure vessel that had been fully degassed and purged with nitrogen, and then degassed. 99.95 parts of a vinyl chloride monomer was fed thereinto. Hot water was led through the jacket to elevate the inner temperature of the polymerization reactor up to 40° C. and the contents in the reactor were stirred at a rotation speed of 200 rpm for 60 minutes for the purpose of dispersing and mixing the macromonomer in the vinyl chloride monomer. Water was led through the jacket to lower the inner temperature of the polymerization reactor to 20° C. or lower, and then 0.07 part of α,α'-azobis-2,4-dimethylvaleronitrile and 1.4 parts of stearyl alcohol were added to the reactor. After homogenizing for 2 minutes, 300 parts of an aqueous solution in which 1.17 parts of sodium laurylsulfate was previously dissolved was added to the vessel, and homogenization was carried out again for 3 minutes to obtain a monomer dispersion. The monomer dispersion was transferred into a 5-liter reactor, and polymerization was initiated while the inside of the reactor was kept heated at 50° C. The subsequent steps after the pressure in the vessel began to lower after about 6 hours were conducted in the same manner as in Example 31 to obtain a vinyl chloride polymer resin powder E-1.

The resin powder E-1 thus obtained was evaluated in point of mean particle size, surface roughness and powdery flowability. The results are shown in Table 7. In the case where the vinyl chloride monomer and the macromonomer were dispersed and mixed at a temperature of 20° C. to 60° C. for at least 1 minute, and then copolymerization was initiated in the experiment of Example 31, the same effect was obtained.

Example 33

99 parts of a vinyl chloride monomer and 1 part of the poly(n-butyl acrylate) macromonomer having an acryloyl group at one end in Preparation Example 2 were polymerized and dried in the same manner as in Example 31 to obtain a vinyl chloride polymer resin powder F.

The resin powder F thus obtained was evaluated in point of mean particle size, surface roughness and powdery flowability. The results are shown in Table 6.

Example 34

99 parts of a vinyl chloride monomer and 1 part of the poly(n-butyl acrylate) macromonomer having an acryloyl group at one end in Preparation Example 2 were polymerized and dried in the same manner as in Example 32 to obtain a vinyl chloride polymer resin powder F-1.

The resin powder F-1 thus obtained was evaluated in point of mean particle size, surface roughness and powdery flowability. The results are shown in Table 7. In the case where the vinyl chloride monomer and the macromonomer were dispersed and mixed at a temperature of 20° C. to 60° C. for at least 1 minute, and then copolymerization was initiated in the experiment of Example 33, the same effect was obtained.

Comparative Example 17

100 parts of a vinyl chloride monomer without the poly(n-butyl acrylate) macromonomer having an acryloyl group at one end in Preparation Example 1 was polymerized, dewatered and dried in the same manner as in Example 11 to obtain a vinyl chloride polymer resin powder G.

The resin powder G thus obtained was evaluated in point of mean particle size, bulk specific gravity, surface roughness and powdery flowability. The results are shown in Table 2. As compared with the products prepared in Examples 11 and 13, the product obtained herein had a larger surface roughness, its bulk specific gravity was low and its powdery flowability was poor.

Comparative Example 18

100 parts of a vinyl chloride monomer without the poly(n-butyl acrylate) macromonomer having an acryloyl group at one end in Preparation Example 1 was polymerized, dewatered and dried in the same manner as in Example 12 to obtain a vinyl chloride polymer resin powder G-1.

The resin powder G-1 thus obtained was evaluated in point of mean particle size, bulk specific gravity, surface roughness and powdery flowability. The results are shown in Table 3. As compared with the products prepared in Examples 12 and 14, the product obtained herein had a larger surface roughness, its bulk specific gravity was low and its powdery flowability was poor.

Comparative Example 19

45 parts of a vinyl chloride monomer and 55 parts of the poly(n-butyl acrylate) macromonomer having an acryloyl group at one end in Preparation Example 1 were polymerized in the same manner as in Example 11.

The polymerization speed was low and when the inside of the polymerization reactor was checked after the vinyl chloride monomer was recovered, the contents aggregated as a whole and resin was not formed.

Comparative Example 20

45 parts of a vinyl chloride monomer and 55 parts of the poly(n-butyl acrylate) macromonomer having an acryloyl group at one end in Preparation Example 1 were polymerized in the same manner as in Example 12.

The polymerization speed was low and when the inside of the polymerization reactor was checked after the vinyl chloride monomer was recovered, the contents aggregated as a whole and resin was not formed.

Comparative Example 21

99.98 parts of a vinyl chloride monomer and 0.02 part of the poly(n-butyl acrylate) macromonomer having an acryloyl group at one end in Preparation Example 1 were polymerized, dewatered and dried in the same manner as in Example 11 to obtain a vinyl chloride resin powder P.

The resin powder P thus obtained was evaluated in point of mean particle size, bulk specific gravity, surface roughness and powdery flowability. The results are shown in Table 2. As compared with the product in Example 11, the product obtained herein had a larger surface roughness, its bulk specific gravity was low and its powdery flowability was poor.

Comparative Example 22

99.98 parts of a vinyl chloride monomer and 0.02 part of the poly(n-butyl acrylate) macromonomer having an acryloyl group at one end in Preparation Example 1 were polymerized, dewatered and dried in the same manner as in Example 12 to obtain a vinyl chloride resin powder P-1.

The resin powder P-1 thus obtained was evaluated in point of mean particle size, bulk specific gravity, surface roughness and powdery flowability. The results are shown in Table 3. As compared with the product in Example 12, the product obtained herein had a larger surface roughness, its bulk specific gravity was low and its powdery flowability was poor.

Comparative Example 23

100 parts of a vinyl chloride monomer without the poly(n-butyl acrylate) macromonomer having an acryloyl group at one end in Preparation Example 1 was polymerized, dewatered and dried in the same manner as in Example 21 to obtain a vinyl chloride polymer resin powder H.

The resin powder H thus obtained was evaluated in point of mean particle size, bulk specific gravity, surface roughness and powdery flowability. The results are shown in Table 4. As compared with the products in Examples 21 and 23, the product obtained herein had a larger surface roughness, its bulk specific gravity was low and its powdery flowability was poor.

Comparative Example 24

100 parts of a vinyl chloride monomer without the poly(n-butyl acrylate) macromonomer having an acryloyl group at one end in Preparation Example 1 was polymerized, dewatered and dried in the same manner as in Example 22 to obtain a vinyl chloride polymer resin powder H-1.

The resin powder H-1 thus obtained was evaluated in point of mean particle size, bulk specific gravity, surface roughness and powdery flowability. The results are shown in Table 5. As compared with the products in Examples 22 and 24, the product obtained herein had a larger surface roughness, its bulk specific gravity was low and its powdery flowability was poor.

Comparative Example 25

45 parts of a vinyl chloride monomer and 55 parts of the poly(n-butyl acrylate) macromonomer having an acryloyl group at one end in Preparation Example 2 were polymerized in the same manner as in Example 21.

The polymerization speed was low and when the inside of the polymerization reactor was checked after the vinyl chloride monomer was recovered, the contents aggregated as a whole and resin was not formed.

Comparative Example 26

45 parts of a vinyl chloride monomer and 55 parts of the poly(n-butyl acrylate) macromonomer having an acryloyl group at one end in Preparation Example 2 were polymerized in the same manner as in Example 22.

The polymerization speed was low and when the inside of the polymerization reactor was checked after the vinyl chloride monomer was recovered, the contents aggregated as a whole and resin was not formed.

In the case where the vinyl chloride monomer and the macromonomer were dispersed and mixed at a temperature of 20° C. to 60° C. for at least 1 minute, and then copolymerization was initiated in the experiment of Example 11, the same effect was obtained.

Comparative Example 27

99.98 parts of a vinyl chloride monomer and 0.02 part of the poly(n-butyl acrylate) macromonomer having an acryloyl group at one end in Preparation Example 1 were polymerized, dewatered and dried in the same manner as in Example 21 to obtain a vinyl chloride resin powder Q.

The resin powder Q thus obtained was evaluated in point of mean particle size, bulk specific gravity, surface roughness and powdery flowability. The results are shown in Table 4. As compared with the product in Example 21, the product obtained herein had a larger surface roughness, its bulk specific gravity was low and its powdery flowability was poor.

Comparative Example 28

99.98 parts of a vinyl chloride monomer and 0.02 part of the poly(n-butyl acrylate) macromonomer having an acryloyl group at one end in Preparation Example 1 were polymerized, dewatered and dried in the same manner as in Example 22 to obtain a vinyl chloride resin powder Q-1.

The resin powder Q-1 thus obtained was evaluated in point of mean particle size, bulk specific gravity, surface roughness and powdery flowability. The results are shown in Table 5. As compared with the product in Example 22, the product obtained herein had a larger surface roughness, its bulk specific gravity was low and its powdery flowability was poor.

Comparative Example 29

100 parts of a vinyl chloride monomer without the poly(n-butyl acrylate) macromonomer having an acryloyl group at one end in Preparation Example 2 was polymerized, dewatered and dried in the same manner as in Example 31 to obtain a vinyl chloride polymer resin powder I.

The resin powder I thus obtained was evaluated in point of mean particle size, surface roughness and powdery flowability. The results are shown in Table 6. The bulk specific gravity of the sample is not shown in the table since the particle size of the sample was so small that a significant difference in bulk specific gravity of the sample could not be detected. As compared with the products in Examples 31 and 33, the product obtained herein had a larger surface roughness and its powdery flowability was poor.

Comparative Example 30

100 parts of a vinyl chloride monomer without the poly(n-butyl acrylate) macromonomer having an acryloyl group at one end in Preparation Example 2 was polymerized, dewatered and dried in the same manner as in Example 32 to obtain a vinyl chloride polymer resin powder I-1.

The resin powder I-1 thus obtained was evaluated in point of mean particle size, surface roughness and powdery flowability. The results are shown in Table 7. The bulk specific gravity of the sample is not shown in the table since the particle size of the sample was so small that a significant difference in bulk specific gravity of the sample could not be detected. As compared with the products in Examples 32 and 34, the product obtained herein had a larger surface roughness and its powdery flowability was poor.

TABLE 1

|  |  | VCM*) (part) | MM*) (part) | Mode of Feeding | Condition for Dispersing and Mixing | Polymerization Process | Polymerization Stability (scale condition) | Remarks |
|---|---|---|---|---|---|---|---|---|
| Examples | 1 | 99.95 | 0.05 | VCM→MM | 30° C. × 1 min (200 rpm) | microsuspension | ○ | |
| | 2 | 50 | 50 | MM→VCM | 40° C. × 60 min (200 rpm) | microsuspension | ○ | |
| | 3 | 50 | 50 | simultaneous feeding | 40° C. × 30 min (200 rpm) | microsuspension | ○ | |
| | 4 | 99.95 | 0.05 | MM→VCM | 30° C. × 1 min (900 rpm) | suspension | ○ | |
| | 5 | 50 | 50 | VCM→MM | 40° C. × 60 min (900 rpm) | suspension | ○ | |
| | 6 | 50 | 50 | simultaneous feeding | 40° C. × 30 min (900 rpm) | suspension | ○ | |
| | 7 | 99.95 | 0.05 | MM→VCM | 30° C. × 1 min (900 rpm) | suspension | ○ | |
| | 8 | 50 | 50 | MM→VCM | 40° C. × 60 min (900 rpm) | suspension | ○ | |

TABLE 1-continued

|  |  | VCM*) (part) | MM*) (part) | Mode of Feeding | Condition for Dispersing and Mixing | Polymerization Process | Polymerization Stability (scale condition) | Remarks |
|---|---|---|---|---|---|---|---|---|
|  | 9 | 50 | 50 | simultaneous feeding | 40° C. × 30 min (900 rpm) | suspension | ○ |  |
|  | 10 | 50 | 50 | in different vessels, MM→VCM | 40° C. × 60 min (450 rpm) | suspension | ○ |  |
| Comparative Examples | 1 | 99.95 | 0.05 | VCM→MM | no heating, no stirring | microsuspension | Δ |  |
|  | 2 | 50 | 50 | MM→VCM | 18° C. × 60 min (200 rpm) | microsuspension | x | Unmixed MM existed on the inner wall of the polymerization reactor and in the latex. |
|  | 3 | 50 | 50 | MM→VCM | 40° C. × 30 sec (200 rpm) | microsuspension | x | Unmixed MM existed on the inner wall of the polymerization reactor and in the latex. |
|  | 4 | 50 | 50 | Simultaneous feeding | 17° C. × 30 min (200 rpm) | microsuspension | x | Unmixed MM existed on the inner wall of the polymerization reactor and in the latex. |
|  | 5 | 50 | 50 | Simultaneous feeding | 40° C. × 30 sec (200 rpm) | microsuspension | x | Unmixed MM existed on the inner wall of the polymerization reactor and in the latex. |
|  | 6 | 99.95 | 0.05 | MM→VCM | no heating, no stirring | suspension | Δ |  |
|  | 7 | 50 | 50 | VCM→MM | 16° C. × 60 min (900 rpm) | suspension | x | Unmixed MM existed on the inner wall of the polymerization reactor and in the latex. |
|  | 8 | 50 | 50 | VCM→MM | 40° C. × 30 sec (900 rpm) | suspension | x | Unmixed MM existed on the inner wall of the polymerization reactor and in the latex. |
|  | 9 | 50 | 50 | simultaneous feeding | 15° C. × 30 min (900 rpm) | suspension | x | Unmixed MM existed on the inner wall of the polymerization reactor and in the latex. |
|  | 10 | 50 | 50 | simultaneous feeding | 40° C. × 30 sec (900 rpm) | suspension | x | Unmixed MM existed on the inner wall of the polymerization reactor and in the latex. |
|  | 11 | 99.95 | 0.05 | MM→VCM | no heating, no stirring | suspension | Δ |  |
|  | 12 | 50 | 50 | MM→VCM | 14° C. × 60 min (900 rpm) | suspension | x | Unmixed MM existed on the inner wall of the polymerization reactor and in the slurry. |
|  | 13 | 50 | 50 | MM→VCM | 40° C. × 30 sec (900 rpm) | suspension | x | Unmixed MM existed on the inner wall of the polymerization reactor and in the slurry. |
|  | 14 | 50 | 50 | simultaneous feeding | 13° C. × 30 min (900 rpm) | suspension | abnormal polymerization | Unmixed MM existed inside the polymerization reactor. |
|  | 15 | 50 | 50 | simultaneous feeding | 40° C. × 30 sec (900 rpm) | suspension | abnormal polymerization | Unmixed MM existed inside the polymerization reactor. |
|  | 16 | 50 | 50 | in different vessels, MM→VCM | 12° C. × 60 min (900 rpm) | suspension | Δ | Unmixed MM existed on the inner wall of the pressure vessel and in the slurry. |

*)VCM: vinyl chloride monomer, MM: poly(n-butyl acrylate) macromonomer having an acryloyl group at one end

TABLE 2

|  | Example 11 | Example 13 | Example 15 | Example 17 | Example 19 | Comparative Example 17 | Comparative Example 19 | Comparative Example 21 |
|---|---|---|---|---|---|---|---|---|
| Vinyl Chloride Monomer (wt. %) | 99.95 | 99.95 | 99 | 90 | 60 | 100 | 45 | 99.98 |

TABLE 2-continued

|  | Example 11 | Example 13 | Example 15 | Example 17 | Example 19 | Comparative Example 17 | Comparative Example 19 | Comparative Example 21 |
|---|---|---|---|---|---|---|---|---|
| Macromonomer (wt. %) | 0.05 | 0.5 | 1 | 10 | 40 | 0 | 55 | 0.02 |
| Weight Average Particle Size (μm) | 125 | 138 | 130 | 135 | 146 | 123 | aggregated | 130 |
| Bulk specific gravity (g/ml) | 0.59 | 0.63 | 0.65 | 0.66 | 0.67 | 0.55 |  | 0.52 |
| Particle Surface Roughness Ra (μm) | 10.2 | 7.5 | 6.6 | 6.2 | 6.0 | 11.8 |  | 11.2 |
| Powdery Flowability W/t (g/sec) | 2.09 | 2.77 | 2.95 | 3.12 | 3.11 | 1.88 |  | 1.93 |
| Blocking Property | ○ | ○ | ○ | Δ | x | ○ |  | ○ |

TABLE 3

|  | Example 12 | Example 14 | Example 16 | Example 18 | Example 20 | Comparative Example 18 | Comparative Example 20 | Comparative Example 22 |
|---|---|---|---|---|---|---|---|---|
| Vinyl Chloride Monomer (wt. %) | 99.95 | 99.95 | 99 | 90 | 60 | 100 | 45 | 99.98 |
| Macromonomer (wt. %) | 0.05 | 0.5 | 1 | 10 | 40 | 0 | 55 | 0.02 |
| Weight Average Particle Size (μm) | 125 | 138 | 130 | 135 | 146 | 123 | aggregated | 130 |
| Bulk specific gravity (g/ml) | 0.59 | 0.63 | 0.65 | 0.66 | 0.67 | 0.55 |  | 0.52 |
| Particle Surface Roughness Ra (μm) | 10.2 | 7.5 | 6.6 | 6.2 | 6.0 | 11.8 |  | 11.2 |
| Powdery Flowability W/t (g/sec) | 2.09 | 2.77 | 2.95 | 3.12 | 3.11 | 1.88 |  | 1.93 |
| Blocking Property | ○ | ○ | ○ | Δ | x | ○ |  | ○ |

TABLE 4

|  | Example 21 | Example 23 | Example 25 | Example 27 | Example 29 | Comparative Example 23 | Comparative Example 25 | Comparative Example 27 |
|---|---|---|---|---|---|---|---|---|
| Vinyl Chloride Monomer (wt. %) | 99.95 | 99.95 | 99 | 94 | 80 | 100 | 45 | 99.98 |
| Macromonomer (wt. %) | 0.05 | 0.5 | 1 | 6 | 20 | 0 | 55 | 0.02 |
| Weight Average Particle Size (μm) | 40 | 43 | 41 | 43 | 42 | 42 | aggregated | 40 |
| Bulk specific gravity (g/ml) | 0.55 | 0.56 | 0.58 | 0.62 | 0.65 | 0.42 |  | 0.45 |
| Particle Surface Roughness Ra (μm) | 0.33 | 0.28 | 0.22 | 0.23 | 0.22 | 0.40 |  | 0.40 |
| Powdery Flowability (g) | 75 | 82 | 91 | 94 | 93 | 68 |  | 70 |
| Blocking Property | ○ | ○ | ○ | Δ | Δ | ○ |  | ○ |

TABLE 5

| | Example 22 | Example 24 | Example 26 | Example 28 | Example 30 | Comparative Example 24 | Comparative Example 26 | Comparative Example 28 |
|---|---|---|---|---|---|---|---|---|
| Vinyl Chloride Monomer (wt. %) | 99.95 | 99.95 | 99 | 94 | 80 | 100 | 45 | 99.98 |
| Macromonomer (wt. %) | 0.05 | 0.5 | 1 | 6 | 20 | 0 | 55 | 0.02 |
| Weight Average Particle Size (μm) | 40 | 43 | 41 | 43 | 42 | 42 | aggregated | 40 |
| Bulk specific gravity (g/ml) | 0.55 | 0.56 | 0.58 | 0.62 | 0.65 | 0.42 | | 0.45 |
| Particle Surface Roughness Ra (μm) | 0.33 | 0.28 | 0.22 | 0.23 | 0.22 | 0.40 | | 0.40 |
| Powdery Flowability (g) | 75 | 82 | 91 | 94 | 93 | 68 | | 70 |
| Blocking Property | ◯ | ◯ | ◯ | Δ | Δ | ◯ | | ◯ |

TABLE 6

| | Example 31 | Example 33 | Comparative Example 29 |
|---|---|---|---|
| Vinyl Chloride Monomer (wt. %) | 99.95 | 99 | 100 |
| Macromonomer (wt. %) | 0.05 | 1 | 0 |
| Weight Average Particle Size (μm) | 1.21 | 1.18 | 1.22 |
| Particle Surface Roughness Ra (μm) | 0.035 | 0.021 | 0.042 |
| Powdery Flowability (g) | 69 | 78 | 60 |

TABLE 7

| | Example 32 | Example 34 | Comparative Example 30 |
|---|---|---|---|
| Vinyl Chloride Monomer (wt. %) | 99.95 | 99 | 100 |
| Macromonomer (wt. %) | 0.05 | 1 | 0 |
| Weight Average Particle Size (μm) | 1.21 | 1.18 | 1.22 |
| Particle Surface Roughness Ra (μm) | 0.035 | 0.021 | 0.042 |
| Powdery Flowability (g) | 69 | 78 | 60 |

INDUSTRIAL APPLICABILITY

The use of the vinyl chloride polymer resin of the present invention is not specifically limited, so far as the polymer resin of the present invention is usable therefor. Examples are molded articles such as pipes, joints, waved plates, flat plates, films, sheets and blow-molded articles, and profile-extruded articles used for gutters, decks and construction materials, for rigid applications; sheets for general use and agricultural use, soft extruded articles for gaskets, hoses, tubes and cut-off plates, canvases, tapes and mats, for soft applications; wallpapers by mechanical embossing, chemical embossing or rotary screen printing, floor materials such as cushion floors and tile carpets, undercoats, sealants, leathers, canvases, and polyvinyl chloride steel plates, for paste resin applications.

The invention claimed is:

1. A process for preparing a vinyl chloride copolymer resin by copolymerizing a vinyl chloride type monomer and a macromonomer having a polymer comprising an ethylenically unsaturated monomer containing a double bond in a main chain, wherein the vinyl chloride type monomer and the macromonomer having a polymer comprising an ethylenically unsaturated monomer containing a double bond in a main chain are previously dispersed and mixed at a temperature from 20° C. to 60° C. for at least 1 minute so as to obtain a mixture solution, and copolymerization reaction of the mixture solution is carried out.

2. The process for preparing a vinyl chloride copolymer resin of claim 1, wherein the vinyl chloride type monomer and the macromonomer having a polymer comprising an ethylenically unsaturated monomer containing a double bond in a main chain are totally put into a dispersing-and-mixing tank, and then dispersed and mixed.

3. The process for preparing a vinyl chloride copolymer resin of claim 1, wherein the ratio of the vinyl chloride type monomer to the total amount of the monomer components constituting the vinyl chloride copolymer resin is at least 50% by weight up to less than 100% by weight.

4. The process for preparing a vinyl chloride copolymer resin of claim 1, wherein the ratio of (A) the vinyl chloride type monomer to (B) the macromonomer having a polymer comprising an ethylenically unsaturated monomer containing a double bond in a main chain (A/B) is 99.95% by weight/0.05% by weight to 60% by weight/40% by weight.

5. The process for preparing a vinyl chloride copolymer resin of claim 1, wherein the vinyl chloride type monomer and the macromonomer having a polymer comprising an ethylenically unsaturated monomer containing a double bond in a main chain are copolymerized in an aqueous medium.

6. The process for preparing a vinyl chloride copolymer resin of claim 1, wherein the vinyl chloride type monomer and the macromonomer having a polymer comprising an ethylenically unsaturated monomer containing a double bond in a main chain are prepared by at least one process selected from the group consisting of emulsion polymerization, suspension polymerization and micro suspension polymerization.

7. The process for preparing a vinyl chloride copolymer resin of claim 1, wherein the macromonomer having a polymer comprising an ethylenically unsaturated monomer containing a double bond in a main chain has a polymerizable reactive group, and said polymerizable reactive group has a structure containing at least one group represented by the following general formula per one molecule:

$$-OC(O)C(R)\!=\!CH_2 \qquad (1)$$

wherein R represents a hydrogen atom or an organic group having 1 to 20 carbon atoms.

8. The process for preparing a vinyl chloride copolymer resin of claim 1, wherein the macromonomer having a polymer comprising an ethylenically unsaturated monomer containing a double bond in a main chain is prepared by living radical polymerization.

9. The process for preparing a vinyl chloride copolymer resin of claim 1, wherein at least one of the macromonomers having a polymer comprising an ethylenically unsaturated monomer containing a double bond in a main chain has a glass transition temperature of at most 0° C.

10. The process for preparing a vinyl chloride copolymer resin of claim 1, wherein the macromonomer has a number average molecular weight ranging from 500 to 100,000.

11. The process for preparing a vinyl chloride copolymer resin of claim 1, wherein the macromonomer has a ratio of weight average molecular weight (Mw) to number average molecular weight (Mn)(Mw/Mn) of small than 1.8.

* * * * *